United States Patent
Kaneko

(10) Patent No.: US 8,545,737 B2
(45) Date of Patent: Oct. 1, 2013

(54) CELLULOSE ACETATE FILM, POLARIZING PLATE, AND LIQUID CRYSTAL DISPLAY DEVICE

(75) Inventor: Yuki Kaneko, Tokyo (JP)

(73) Assignee: Konica Minolta Opto, Inc., Tokyo (JP)

(*) Notice: Subject to any disclaimer, the term of this patent is extended or adjusted under 35 U.S.C. 154(b) by 14 days.

(21) Appl. No.: 13/386,683

(22) PCT Filed: May 25, 2010

(86) PCT No.: PCT/JP2010/058794
§ 371 (c)(1),
(2), (4) Date: Jan. 24, 2012

(87) PCT Pub. No.: WO2011/016279
PCT Pub. Date: Feb. 10, 2011

(65) Prior Publication Data
US 2012/0119169 A1 May 17, 2012

(30) Foreign Application Priority Data
Aug. 5, 2009 (JP) ................. 2009-182702

(51) Int. Cl.
*F21V 9/14* (2006.01)
*G02B 5/30* (2006.01)
*G02C 7/12* (2006.01)
*G02F 1/1335* (2006.01)

(52) U.S. Cl.
USPC ............. 252/585; 349/96; 428/1.1; 428/1.54; 428/343; 428/480; 359/489.07; 536/69

(58) Field of Classification Search
USPC .................. 252/585; 349/96; 428/1.1, 1.54, 428/343, 480; 359/489.07; 536/69
See application file for complete search history.

(56) References Cited

FOREIGN PATENT DOCUMENTS

| CN | 101427163 | 5/2009 |
|---|---|---|
| JP | 2000-111914 | 4/2000 |
| JP | 2000-154261 | 6/2000 |
| JP | 2001-188128 | 7/2001 |
| JP | 2002-202411 | 7/2002 |
| JP | 2005-025120 | 1/2005 |
| JP | 2007-304376 | 11/2007 |
| JP | 2008-183849 | 8/2008 |
| JP | 2009-001696 | 1/2009 |
| JP | 2009-045813 | 3/2009 |
| WO | 2009/060743 | 5/2009 |

OTHER PUBLICATIONS

Chinese Office Action, Application No. 201080034279.5, mailing date: Jun. 20, 2013.
English translation of Chinese Office Action, Application No. 201080034279.5, mailing date: Jun. 20, 2013.

*Primary Examiner* — Bijan Ahvazi
(74) *Attorney, Agent, or Firm* — Lucas & Mercanti, LLP

(57) ABSTRACT

Disclosed are a cellulose acetate film characterized by comprising cellulose acetate that has a degree of acetylation of 51.0-56.0% and a compound represented by Formula (1) and having a total average degree of substitution of 6.1-6.9, a polarizing plate capable of maintaining excellent visibility, and a liquid crystal display device having excellent visibility and viewing angle characteristics. (In Formula (1), $R_1$ to $R_8$ may be the same or different and each represents an (un)substituted alkylcarbonyl or an (un)substituted aryl carbonyl).

7 Claims, 2 Drawing Sheets

CELLULOSE ACETATE FILM, POLARIZING PLATE, AND LIQUID CRYSTAL DISPLAY DEVICE

CROSS REFERENCE TO RELATED APPLICATION

This Application is a 371 of PCT/JP2010/058794 filed on May 25, 2010 which, in turn, claimed the priority of Japanese Patent Application No 2009-182702 filed on Aug. 5, 2009, applications are incorporated by reference herein.

TECHNICAL HELD

The present invention relates to a polarizing plate exhibiting enable to be thinner and low cost and to a liquid crystal display device using the same, in which employed is a cellulose acetate film having excellent flatness and enhancing retardation as a retardation film which also has a function of protective film and capable to be thinner when employed to the liquid crystal display device.

BACKGROUND

Recently, liquid crystal display device is used not only for monitors of personal computer but for televisions, and required therein is thinner display device with progressing large sized and high brightness display device. Therefore, further thinner members are also required for each member used for the liquid crystal display device as well as higher stability in quality.

Therefore, investigated is a polarizing plate in which cellulose triacetate film is provided a function of retardation with further thinning the film and enhancing stability thereof, because cellulose acetate film has excellent flatness and isotropy, and conventionally used to a protective film of a polarizing plate.

Since the cellulose triacetate film originally has high isotropy and weak birefringence, thereby it is not adapted to use for retardation film. Therefore, investigated are retardation films in which so called a retardation increasing agent is added into cellulose triacetate resin, or used is a mixed fatty acid ester of cellulose such as cellulose acetate propionate which has higher birefringence among cellulose ester resins (for example, Patent documents 1 and 2).

However, in order to have thinner retardation film, it was required to increase addition amount of a retardation increasing agent per thickness of the retardation film in which a retardation increasing agent is added. It sometimes causes problems such as bleed out which is a precipitation of additives from film.

Further, even though a retardation film using mixed fatty acid esters of cellulose has higher birefringence than cellulose triacetate, in order to have thinner film, required is further higher stretching ratio and it results in higher difficulty to produce film stably. Further, it is also difficult to synthesize mixed fatty acid ester of cellulose itself and there is further problem in low cost production of polarizing plate.

As a protective film for liquid crystal cell side of polarizing plate which is required to have function of optical compensation, inventors of the present invention investigate a protective film also having a function of a retardation film by realizing retardation by employing cellulose ester having acyl group total substitution degree of 2.1 to 2.6 which has high birefringence. As a result, a production of the film has been achieved by using material which has excellent retardation, and further enable to be thinner and low cost.

However, when a liquid crystal display device is prepared by using the obtained polarizing plate, a slight unevenness like stripe was observed in displaying black image. Further, when it was stored for long period in a high temperature and high humidity environment, unevenness like wave was observed in displaying image and it deteriorated visibility.

These problems have to be solved specifically when it is employed as a large size liquid crystal display device such as large size television or outer monitor and under severe conditions than conventional use such as with high-intensity backlight or under external environment

PRIOR ART DOCUMENT

Patent Document

Patent Document 1: Unexamined Japanese Patent Application Publication (hereinafter referred to as JP-A) No. 2000-111914

Patent Document 2: JP-A No. 2001-188128

DISCLOSURE OF THE INVENTION

Problems to be Solved by the Invention

An object of the present invention is to provide a polarizing plate comprising a film which functions as a protective film as well as a retardation film by using a cellulose ester resin which has low degree of substitution and developing high retardation and capable to be thinner and low cost. Other object of the present invention is to provide a polarizing plate which has excellent visibility even in the case of employing to liquid crystal display devices such as large sized television or monitor which is required high brightness and high image quality, and a liquid crystal display device using thereof which exhibits excellent visibility and viewing angle property.

Means to Solve the Problems

The above object has been attained by the following constitutions:

1. A cellulose acetate film comprising cellulose acetate having a degree of acetylation of 51.0-56.0% and a compound represented by Formula (1) having a total average substitution degree of 6.1-6.9,

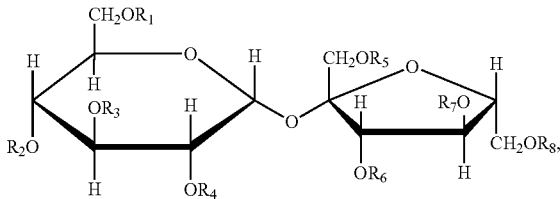

Formula (1)

wherein $R_1$ to $R_8$ each represents a substituted or an unsubstituted alkylcarbonyl group or a substituted or an unsubstituted arylcarbonyl group and $R_1$ to $R_8$ may be the same or different.

2. The cellulose acetate film of item 1, wherein the compound represented by Formula (1) has a distribution range of substitution degree of 4-8.

3. The cellulose acetate film of item 1 or 2 further comprising an ester compound represented by Formula (2), $$B\text{-}(G\text{-}A)_n\text{-}G\text{-}B \qquad \text{Formula (2):}$$

wherein B represents hydroxyl group or carboxylic residue, G represents alkylene glycol residue having carbon number of 2-12 or aryl glycol residue having carbon number of 6-12 or oxyalkylene glycol residue having carbon number of 4-12, A represents alkylene dicarboxylic residue having carbon number of 4-12 or aryl dicarboxylic residue having carbon number of 6-12, and n represents an integer of not less than 1.

4. The cellulose acetate film of any one of items 1 to 3, wherein the cellulose acetate film has a retardation value Ro of 30-90 run defined by Expression (I), and a retardation value Rt of 70-300 nm defined by Expression (II);

$$Ro=(nx-ny)\times d, \qquad \text{Expression (I):}$$

$$Rt=\{(nx+ny)/2-nz\}\times d, \qquad \text{Expression (II):}$$

wherein nx represents an in-plane refractive index in a slow axis direction; ny represents an in-plane refractive index in a fast axis direction; nz represents a refractive index in the thickness direction; and d represents a thickness (nm) of the film.

5. The cellulose acetate film of any one of items 1 to 4, wherein an internal haze values of the cellulose acetate film is not more than 0.05, provided that the internal haze is determined by using a haze meter by dropping a solvent having a refractive index of +0.05--0.05 onto a film surface.

6. A polarizing plate wherein the cellulose acetate film of any one of items 1 to 5 is employed to at least one side of the polarizing plate.

7. A liquid crystal display wherein the polarizing plate of item 6 is employed to at least one side of the liquid crystal display.

Effects of the Invention

The present invention made it possible to provide a polarizing plate exhibiting excellent visibility and viewing angle property when employed to the liquid crystal display device by employing a retardation film also having function of protective film and capable to be thinner, and a liquid crystal display device using the same.

PREFERRED EMBODIMENTS TO CARRY OUT THE INVENTION

Figure 1:
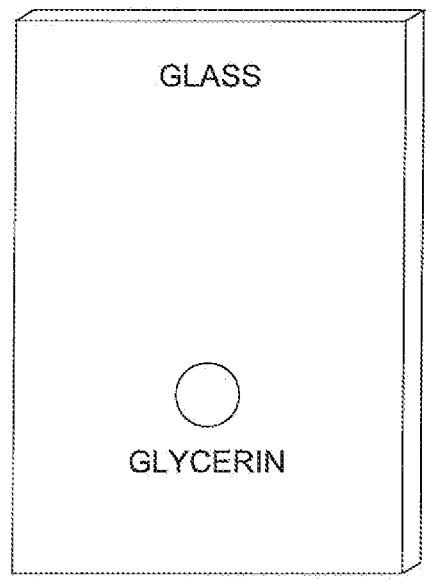
FIG. 1 is a schematic diagram showing a status of dropping glycerin on a glass slide.

The inventors of the present invention investigated to resolve problems described above. Namely, the inventors investigated to use a cellulose ester resin having low degree of substitution and developing high retardation as a protective film of cell side of liquid crystal, whereby to apply the function of a retardation film and to provide a polarization plate by using low cost and thinner protective film, and further whereby to provide a polarizing plate which has excellent visibility even in the case of employing to liquid crystal display devices such as large sized television or monitor which is required high brightness and high image quality.

As a result of such diligent investigations, the inventors found that unevenness like stripe in displaying black image or unevenness hie wave after stored in a high temperature and high humidity environment in case of evaluating above described liquid crystal display device was caused by at least a flatness of a retardation film comprising a cellulose ester film having low degree of substitution provided on a liquid crystal cell side of a polarizer.

As a result of further diligent investigations, the inventors found that when cellulose ester film having low degree of substitution and developing high retardation was used as a retardation film as the present invention, the retardation film deteriorated slightly unless an additive containing specific functional group was employed, whereby above described problem related to visibility occurred in liquid crystal display device.

However, it could not be resolved merely by adding a compound having one structure.

An optimal embodiment to practice the present invention will now be detailed, however the present invention is not limited thereto.

As a result of diligent investigations about above problem, the inventors found that it enabled to obtain cellulose acetate film having highly flatness even in thin film and high durability after saponified treatment by using cellulose acetate having low degree of substitution as a retardation film in combination with a compound which has at least one hydroxyl group and comprises at least 2 or more sugar derivatives each having different number of hydroxyl group. Further, the inventors found that it enabled to largely improve unevenness like stripe in displaying black image or unevenness like wave after stored in a high temperature and high humidity environment by using the liquid crystal display device incorporating the polarization plate using this cellulose acetate film of the present invention as retardation film.

Further, liquid crystal display device exhibiting excellent visibility and viewing angle can be provided by employing polarizing plate related to the present invention to at least one side of liquid crystal cell.

<Haze Measured by Haze Meter in the Present Invention>

The cellulose acetate film of the present invention is characterizes by having a haze in the predetermined range which are measured by haze meter in case of dropping a solvent having refractive index of a film refractive index ±0.05 onto a film interface, even after stretching process so as to obtain foregoing retardation.

It was considered that haze of cellulose acetate film is required to be reduced in order to improve a front contrast When haze is classified based on whether it causes from inside of film or surface of film, it is found to be more effective to reduce an internal haze.

Herein, the internal haze is referred to as a haze which causes by scattering factor at inside of film, and inside of film is referred to as a portion of more than 5 µm from a surface of the film.

The internal haze value was determined via haze meter by dropping a solvent having refractive index of a film refractive index ±0.05 onto a film interface, in order to neglect a haze from film surface.

<Measuring Device of Haze of Film Inside (Hereinafter, Referred to as Internal Haze>

Used are a haze meter (turbidity (NDH2000 produced by Nippon Denshoku Kogyo), with a halogen light of 5V and 9

W as a light source, and silicon photo cell (with relative luminous efficiency filter) as a light receiving section.

In the present invention, a haze value is preferable not more than 0.02, when haze is measured by using above device by dropping a solvent having a reflective index of a film reflective index +0.05 to −0.05 onto the film interface. The haze is measured according to JIS K7136.

The internal haze may be measured as follows: Procedure will be explained with reference to the accompanying FIGS. 1 to 4.

At first, blank haze 1 is measured which is caused from measuring instrument other than film.

1. One drop of glycerin (0.05 ml) is applied onto a cleaned glass slide. Herein, be careful not to form a bubble in a droplet. Glass cleaned by using detergent should be used because glass is sometimes contaminated even though it looks clean. Refer to FIG. 1.

2. Place a cover glass thereon. Glycerin spreads without any pressing the cover glass.

3. Set the glass slide in a haze meter and blank haze 1 is measured. Consequently, haze 2 including sample is measured.

4. Drop 0.05 ml of glycerin on the glass slide. Refer to FIG. 1.

Figure 2:
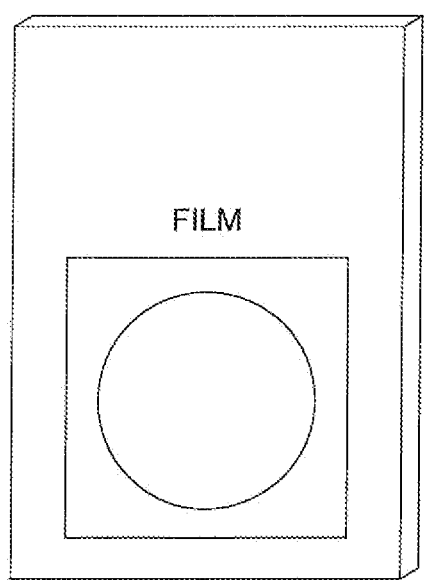
FIG. 2 is a schematic diagram showing a status of placing a sample film on the glycerin.

5. Place a measuring sample film on the glycerin. Refer to FIG. 2.

Figure 3:
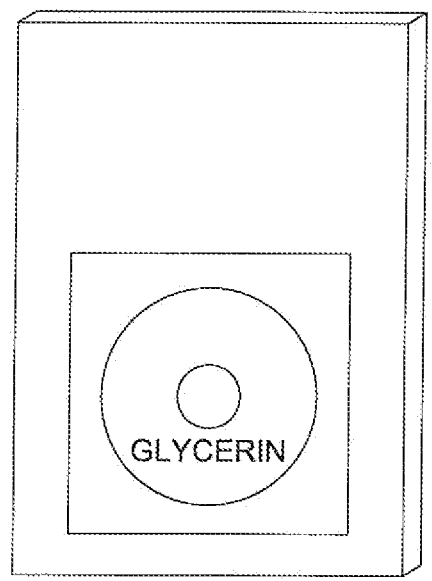
FIG. 3 is a schematic diagram showing a status of dropping glycerin on the sample film.

6. Drop 0.05 ml of glycerin on the sample film. Refer to FIG. 3.

Figure 4:
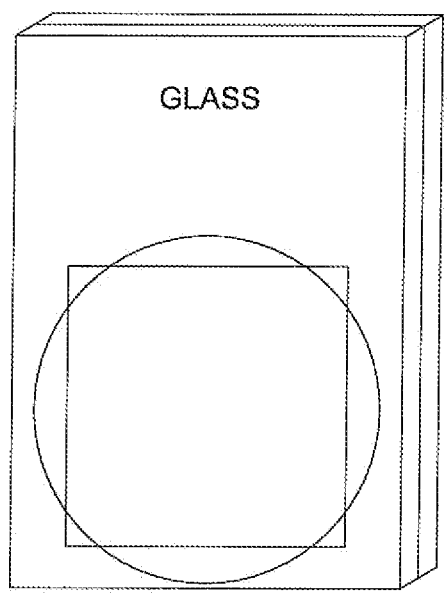
FIG. 4 is a schematic diagram showing a status of placing a cover glass on the glycerin.

7. Place a cover glass thereon. Refer to FIG. 4.

8. Set the glass slide in a haze meter and blank haze 2 is measured.

9. Calculate Internal Haze of the present invention according to the following expression:

(Haze 2)−(Haze 1)=(Internal Haze of the present invention)

Glass and glycerin employed above are as follows:
Glass: MICRO SLIDE GLASS 59213 MATSUNAMI
Glycerin: special grade produced by Kanto Chemical The internal haze of cellulose acetate film related to the present invention can be achieved by employing the cellulose acetate film containing the compound represented by Formula (1).

Compound represented by Formula (1) and reference compound will be described, however the present invention is not limited thereto.

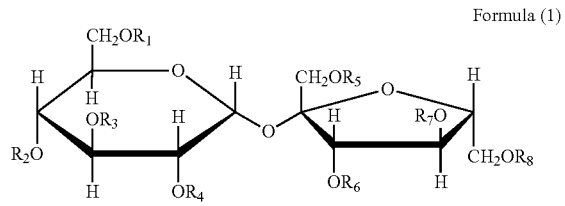

Formula (1)

| No. of Compound | R | Average substitution degree |
|---|---|---|
| 1-1 | —C(=O)—CH₃ | 6.0 |
| 1-2 | —C(=O)—CH₃ | 6.1 |
| 1-3 | —C(=O)—CH₃ | 6.5 |
| 1-4 | —C(=O)—CH₃ | 6.9 |
| 1-5 | —C(=O)—CH₃ | 7.0 |
| 1-6 | —C(=O)—CH₃ | 8.0 |
| 1-7 | —C(=O)—C₆H₄—CH₃ | 6.1 |
| 1-8 | —C(=O)—C₆H₄—CH₃ | 6.5 |
| 1-9 | —C(=O)—C₆H₄—CH₃ | 6.9 |
| 1-10 | —C(=O)—C₆H₅ | 6.1 |
| 1-11 | —C(=O)—C₆H₅ | 6.5 |
| 1-12 | —C(=O)—C₆H₅ | 6.9 |
| 1-13 | —C(=O)—CH(CH₃)₂ | 6.1 |
| 1-14 | —C(=O)—CH(CH₃)₂ | 6.5 |

-continued
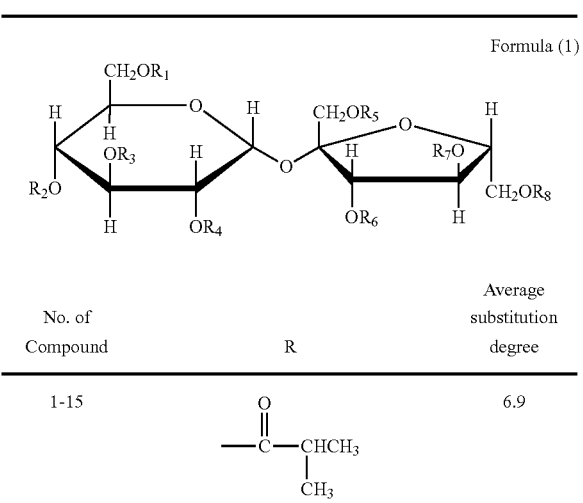
Formula (1)
| No. of Compound | R | Average substitution degree |
|---|---|---|
| 1-15 | 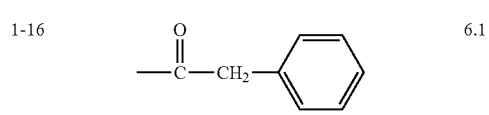 | 6.9 |
| 1-16 | 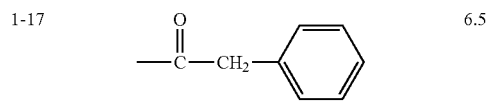 | 6.1 |
| 1-17 | 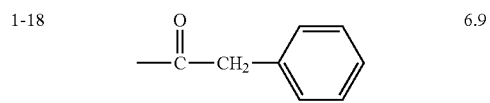 | 6.5 |
| 1-18 | | 6.9 |
-continued
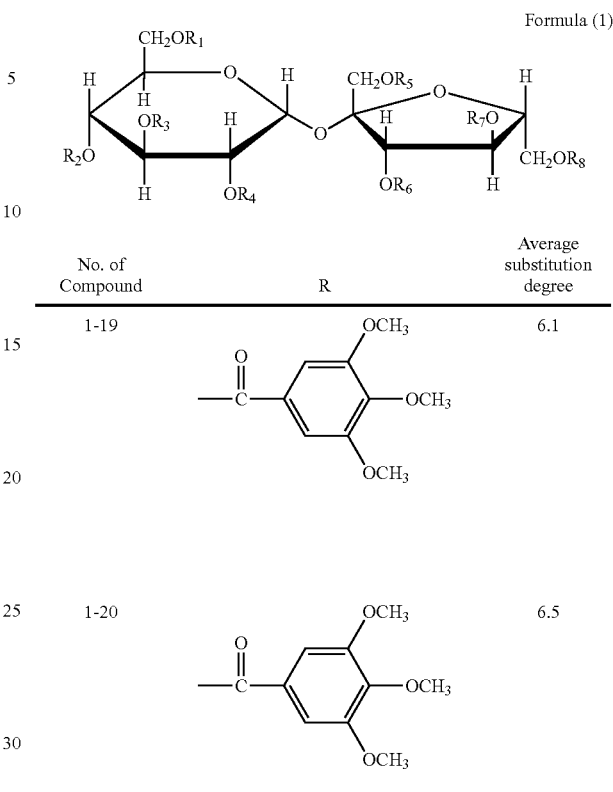
Formula (1)
| No. of Compound | R | Average substitution degree |
|---|---|---|
| 1-19 | 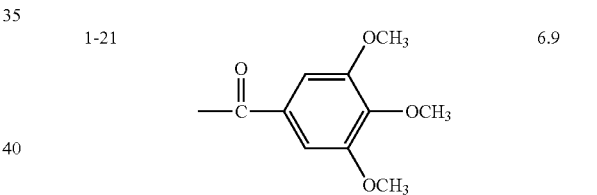 | 6.1 |
| 1-20 | | 6.5 |
| 1-21 | | 6.9 |
EXAMPLE OF SYNTHESIS
Compound of the Present Invention
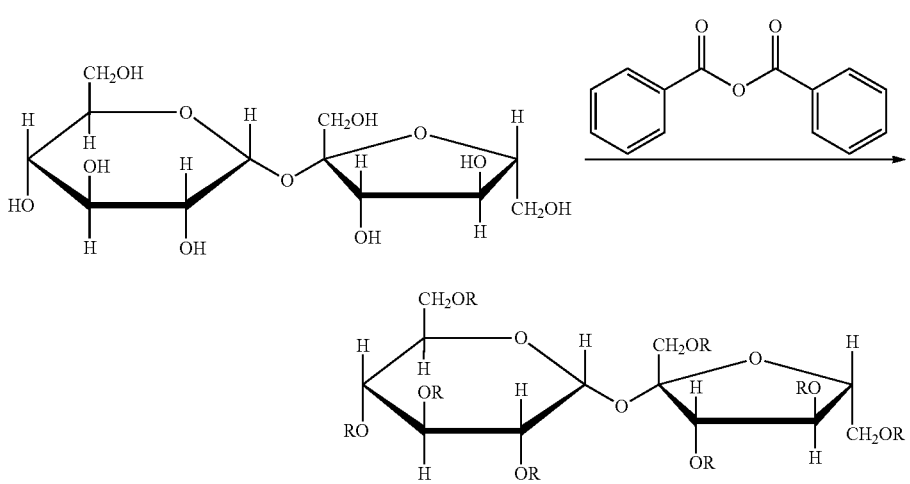

| R | Number of Substitution |
|---|---|
| Exemplifying Compound A-1 | |
| —H | (0) |
| 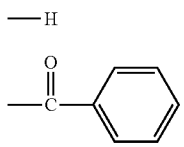 | (8) |
| Exemplifying Compound A-2 | |
| —H | (1) |
| 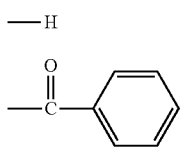 | (7) |
| Exemplifying Compound A-3 | |
| —H | (2) |
| 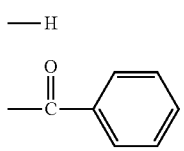 | (6) |
| Exemplifying Compound A-4 | |
| —H | (3) |
| 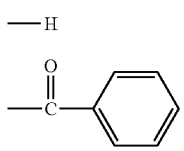 | (5) |
| Exemplifying Compound A-5 | |
| —H | (4) |
| 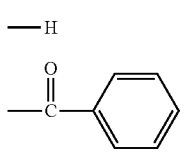 | (4) |

A four-necked flask equipped with a stirrer, a reflux condenser, a thermometer and a nitrogen gas introducing tube was charged with 342 g (0.1 mol) of saccharose, 180.8 g (0.8 mol) of benzoic acid anhydride and 379.7 g (4.8 mol) of pyridine, and the temperature was raised with stirring while introducing a nitrogen gas through the nitrogen gas introducing tube to conduct an esterification reaction at 70° C. for 5 hours. Next, after the inside of the flask was made to a reduced pressure of not higher than $4\times10^2$ Pa to eliminate excess pyridine by evaporation at 60° C., the inside of the flask was made to a reduced pressure of not higher than $1.3\times10$ Pa and a temperature of 120° C. to eliminate the most part of benzoic acid anhydride and generated benzoic acid by evaporation. Then, 1 L of toluene and 300 g of a 0.5% by mass of sodium carbonate aqueous solution were added, and after stirring at 50° C. for 30 minutes, the system was left standing to take but the toluene layer. Finally, the toluene layer taken out was added with 100 g of water, and the toluene layer was taken out after washing at ordinary temperature for 30 minutes, toluene being eliminated by evaporation at 60° C. under a reduced pressure (not more than $4\times10^2$ Pa), whereby a mixture of compounds A-1, A-2, A-3, A-4 and A-5 was prepared. The prepared compound was analyzed by means of HPLC and LC-MASS, and it has been proved that A-1 is 7% by mass, A-2 is 58% by mass, A-3 is 23% by mass, A-4 is 9% by mass and A-5 is 3% by mass. Herein, by purification of a part of the prepared mixture by column chromatography utilizing silica gel, each compound A-1, A-2, A-3, A-4 and A-5 each having a purity of 100% was obtained.

In the present invention, compound represented by Formula (1) added into cellulose acetate film has a total average substitution degree of 6.1 to 6.9, preferable in the range of 4 to 8. Further, distribution range of substitution degree may be arranged to pre-determined substitution degree by arranging a reaction time of esterification or by mixing compounds having different substitution degrees.

<Cellulose Acetate Film>

With respect to cellulose acetate film related to the present invention, an acyl group substitution degree is 51.0% to 56.0%, preferable 54.0% to 56.0%, in view of exhibiting high retardation, capable to be thinner even when it is a retardation film having high retardation and decreasing a stretching ratio for developing retardation.

Even though required retardation value is different depending on its required optical compensation effect, in view of utilizing the characteristics of high retardation, cellulose acetate film of the present invention has retardation Ro of in-plane direction defined by Expression (I) described before is not less than 30 nm, preferable in the range of 30 to 200 nm, more preferable in the range of 30 to 90 nm; and retardation Rt in the thickness direction defined by Expression (II) described before is not less than 70 nm, preferable in the range of 70 to 300 nm.

A method for arranging of retardation is not specifically limited, however, generally used is a method in which retardation is arranged by stretching process. Method for arrangement will be detailed later.

Cellulose acetate used in retardation film and polarizing plate protective film related to the present invention may be synthesized by well-known method.

In the case of employing cellulose acetate as retardation film and polarizing plate protective film related to the present invention, cellulose as a raw material for cellulose acetate is not specifically limited, but usable are cotton linter, wood pulp (obtained from acicular trees or from broad leaf trees) or kenaf. The cellulose acetates obtained from those may also be used by mixing with each other in any ratio.

Cellulose acetate of the present invention may be prepared by well-known method. Specifically, synthesis may be carried out by using a method described in JP-A 10-45804 as a reference.

As cellulose acetate available on the market, listed are L20, L30, L40, and L50 produced by Daicel Corporation, Ca398-3, Ca398-6, Ca398-10, CA398-30, and Ca394-60S produced by Eastman Chemical Company.

(Viscosity of Solution)

In the present invention, it is preferable to use in blending cellulose acetate having weight average molecular weight/viscosity of 12 to 2.4 and 4.4 to 5.5. It enables to improve break resistance by arranging weight average molecular weight being high and it enables to enhance productivity of film by lowering a viscosity whereby increasing solid concentration of dope (hereinafter, solution in which resin is dissolved in solvent is referred to as dope). Consequently, achieved is a method for producing film having high productivity and without breakage by combining above effects.

As a method for preparing dope, known are a method in which dope is prepared at a temperature of 0° C. or more (ordinary or high temperature) and a cooled preparation method in which dope is prepared at low temperature. In case of preparing at a temperature of 0° C. or more, it is preferable to use halogenated hydrocarbon (specifically methylene chloride) as an organic solvent. In Journal of Technical Disclosure, Laid-Open No. 2001-1745, 58, (issued on Mar. 15, 2001, by Japan Institute of Invention and Innovation), organic solvent is described in paragraphs 12 to 15 and preparation method is described in paragraphs 22 to 25.

Viscosity of cellulose acetate solution of the present invention is preferable 15 to 140 Pa·s and temperature of dope in dissolving and filtering process is preferable not less than 20° C. and not more than 30° C. More preferably, viscosity of low viscosity cellulose acetate solution is in the range of 30 to 90 Pa·s. Viscosity of cellulose acetate solution of the present invention can be determined by using B type viscometer VS-A1 (produced by Shibaura Systems Co., Ltd) at 25° C. according to the method described in JIS Z 8803.

(Molecular Weight Distribution)

The average molecular weight and the molecular weight distribution of cellulose acetate can be measured by a well-known method using high performance liquid chromatography. A number average molecular weight (Mn) and weight-average molecular weight (Mw) can be calculated using these values, and the ratio can be calculated.

The measurement condition is as follows

Solvent: Methylene chloride

Column: Shodex K806, K805, K803G (produced by Showa Denko K.K., three columns were employed via connections)

Column temperature: 25° C.

Sample concentration: 0.1% by mass

Detector: RI Model 504 (produced by GL Sciences Inc.)

Pump: L6000 (produced by Hitachi, Ltd.)

Feed rate: 1.0 ml/min

Calibration: Standardized polystyrene STK Standard Polystyrene (made by TOSOH CORP.). A calibration curve is drawn by using 13 samples in the range of Mw 1,000,000-500. The intervals in Mw values among the 13 samples are preferably equal.

Productivity becomes lower, when molecular weight of cellulose acetate is low and resulting in excess decreasing stress at breakage, or when molecular weight of cellulose acetate is high and resulting in excess increasing viscosity of cellulose acetate solution. Molecular weight of cellulose acetate is preferable in the range of 100,000 to 200,000 based on weight average molecular weight (Mw), more preferable in 30,000 to 160,000. The ratio of number average molecular weight (Mn) to weight average molecular weight (Mw), Mn/Mw, of the cellulose acetate used for the present invention is preferably not less than 1.0 and less than 5.0, more preferably not less than 2.5 and less than 4.0.

Degree of polymerization of cellulose acetate is preferable 200 -800, more preferable 250-650, further preferable 250-450 and specifically preferable 250-400 as a viscosity average degree of polymerization. Viscosity average degree of polymerization can be determined by limiting viscosity method (Uda Kazuo, Saito Hideo, Senigakkaishi, volume 18 (1), pages 105-120, 1962). A method for measuring viscosity average degree of polymerization is also described in JP-A No. 9-95538.

Ro of cellulose acetate film of the present invention is not less than 30 rim and Rt is not less than 70 nm. These Ro and Rt can be controlled by stretching treatment in general film production process.

In view of stabilizing in dimensions under change of environment which is main factor of unevenness of polarizing plate, cellulose acetate film of the present invention preferably incorporates ester compound represented by Formula (2) as plasticizer.

In Formula (2), an alkylene glycol component having a carbon number of 2-12 includes such as ethylene glycol, 1,2-propylene glycol, 1,3-propylene glycol, 1,2-butanediol, 1,3-butanediol, 1,2-propanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylol pentane), 2-n-butyl-2-ethyl-1,3-propanediol (3,3-dimethylol heptane), 3-methyl-1,5-pentanediol, 1,6-hexanediol, 2,2, 4-trimethyl-1,3-pentanediol, 2-ethyl-1,3-hexanediol, 2-methyl-1,8-octanediol, 1,9-nonanediol, 1,10-decanediol and 1,12-octadecanediol; and these glycols are utilized alone or as a mixture of at least two types.

An alkylene glycol having a carbon number of 2-12 is specifically preferable because of excellent compatibility with cellulose acetate.

An aryl glycol component having a carbon number of 6-12 includes such as hydroquinone, resorcin, bisphenol A, bisphenol F and bisphenol, and these glycols are utilized alone or as a mixture of at least two types.

Further, an oxyalkylene glycol component, having a carbon number of 4-12 includes such as diethylene glycol, triethylene glycol, tetraethylene glycol, dipropylene glycol and tripropylene glycol; and these glycols can be utilized alone or as a mixture of at least two types.

An alkylene dicarboxylic acid component, having a carbon number of4-12 includes such as succinic acid, maleic acid, fumaric acid, glutaric acid, adipic acid, azelaic acid, sebacic acid and dodecane dicarboxylic acid; and these may be utilized alone or as a mixture of not less than two types. An arylene dicarboxylic acid component having a carbon number of 6-12 includes phthalic acid, terephthalic acid, isophthalic acid, 1,5-naphthalene dicarboxylic acid and 1,4-naphthalene dicarboxylic acid.

Specific examples of ester compounds represented by Formula (2) of the present invention will be listed below; however the present invention is not limited thereto.

2-1

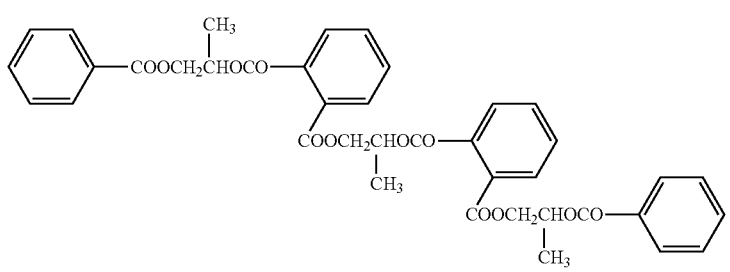

Mw: 696

-continued
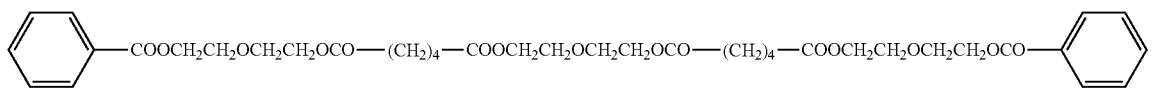
2-2
Mw: 746
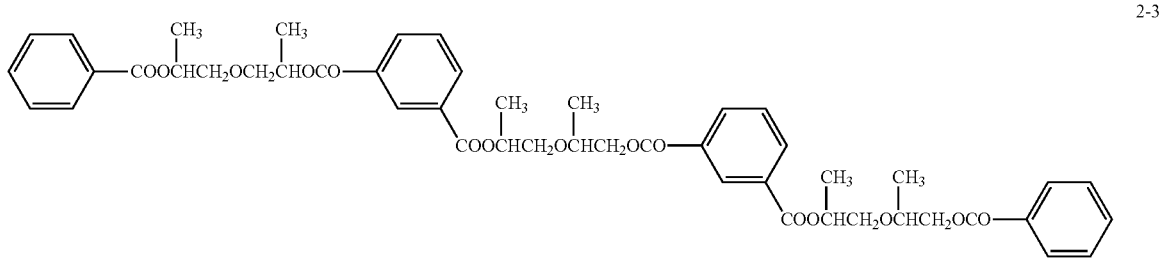
2-3
Mw: 830
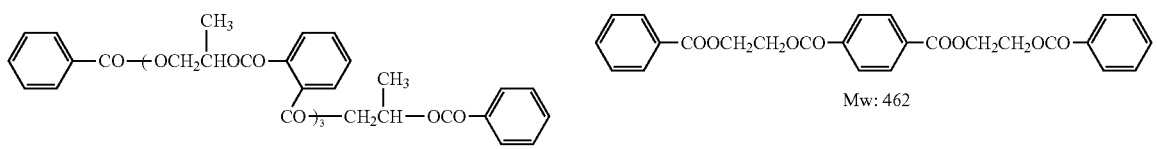
2-4
Mw: 886
2-5
Mw: 462
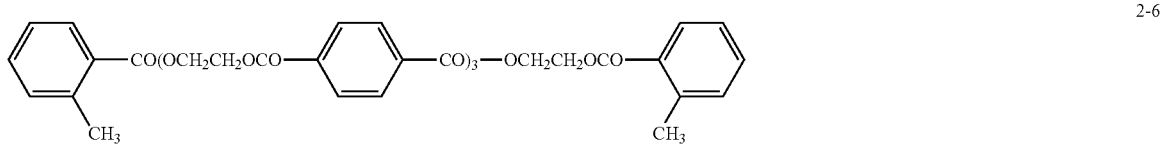
2-6
Mw: 874
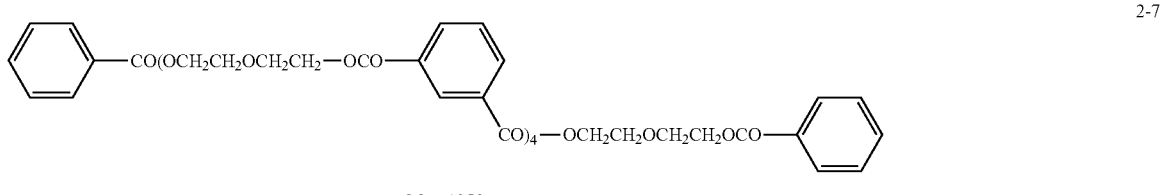
2-7
Mw: 1258
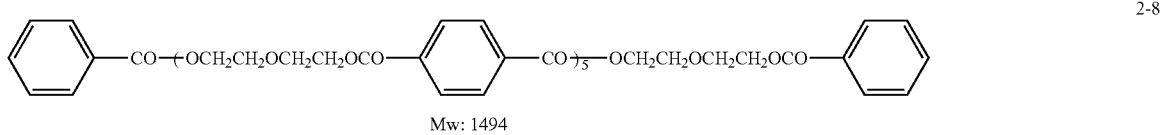
2-8
Mw: 1494
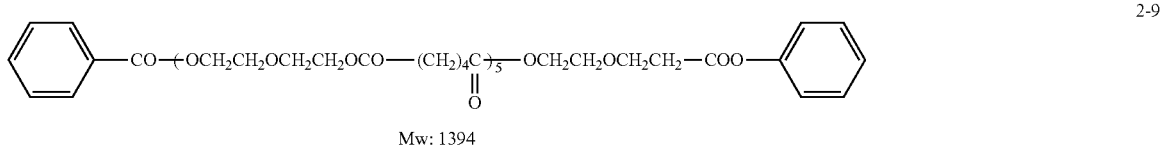
2-9
Mw: 1394
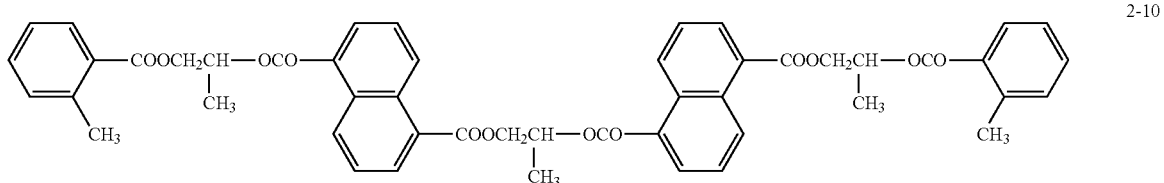
2-10
Mw: 852

2-11
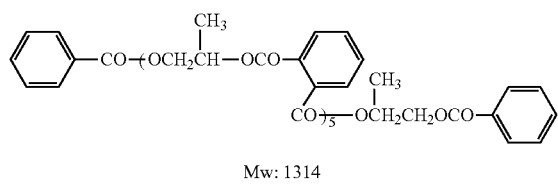
Mw: 1314
2-12
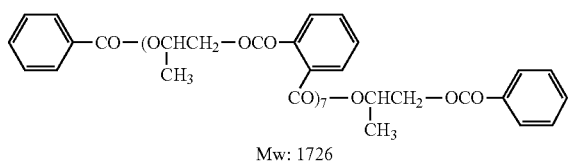
Mw: 1726
2-13
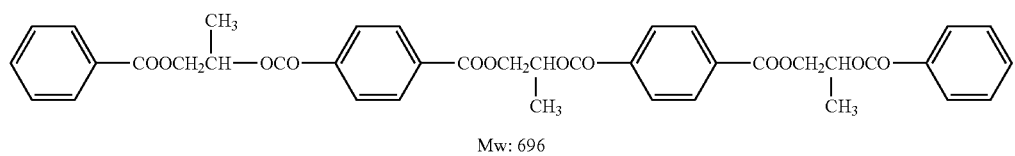
Mw: 696
2-14
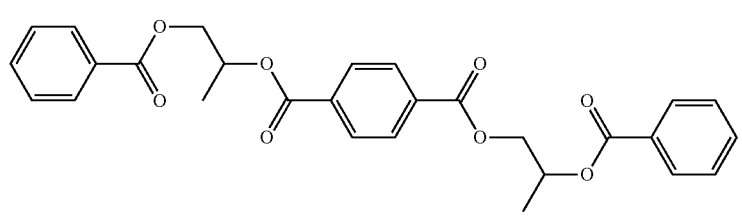
Mw: 491
2-15
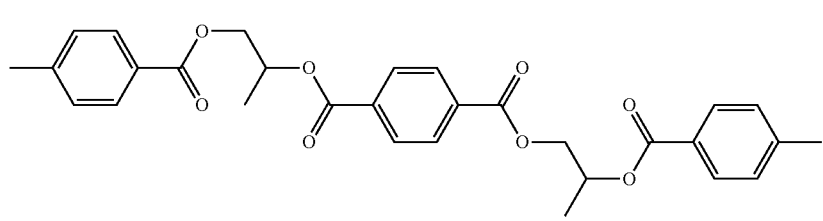
Mw: 519
2-16
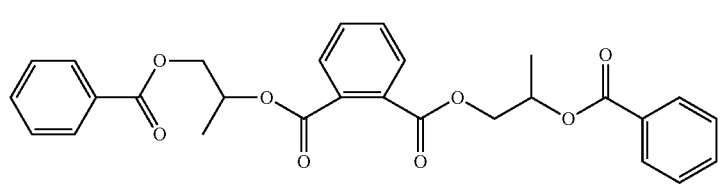
Mw: 491
2-17
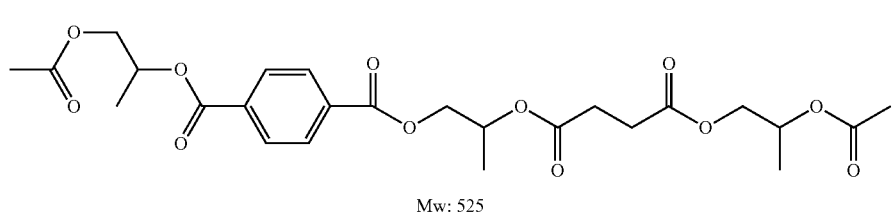
Mw: 525
2-18
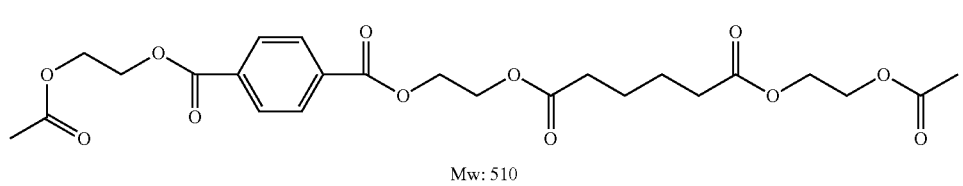
Mw: 510

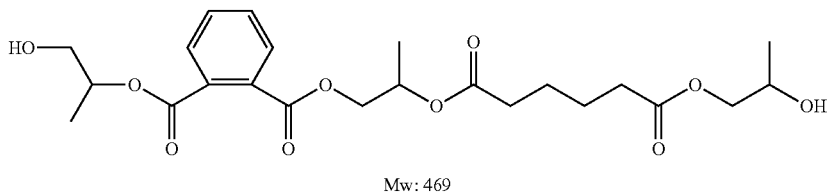

Mw: 469

<Other Additives>
(Plasticizers)

Cellulose acetate film of the present invention may appropriately incorporate plasticizer other than compound represented by Formula (2) in order to achieve an effect of the present invention.

The plasticizer used in the present invention is not specifically limited. However, a preferable plasticizer is selected form a polycarboxylate plasticizer, a glycolate plasticizer, a phthalate plasticizer, a fatty acid ester plasticizer; a polyalcohol ester plasticizer, an ester plasticizer and an aryl based plasticizer.

Of these, in case of using 2 or more kinds of plasticizers, a polycarboxylate plasticizer is preferably used for at least one of the plasticizers.

A polyalcohol ester plasticizer is a plasticizer containing an ester of an aliphatic polyalcohol having a valence of two or more and a monocarboxylic acid, and it preferably contains an aromatic ring or a cycloalkyl ring in the molecule. It is preferably an aliphatic polyalcohol ester having a valence of 2-20.

The polyalcohol preferably used for the present invention is represented with the following Formula (a).

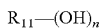 Formula (a):

wherein $R_{11}$ represents an organic group having a valence of n, n represents a positive integer of two or more, and an OH group represents alcoholic and/or a phenolic hydroxyl group.

Examples of preferable polyalcohol are listed below, however the present invention is not limited thereto.

Specific examples of polyalcohol include: adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-bunanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol.

Specifically, triethylene glycol, tetraethylene glycol, dipropylene glycol, tripropylene glycol, sorbitol, trimethylol propane and xylitol are preferable.

As the monocarboxylic acid to be used in the polyalcohol ester, a known aliphatic monocarboxylic acid, alicyclic monocarboxylic acid and aromatic monocarboxylic acid may be employed, though the monocarboxylic acid is not specifically limited. Specifically, aliphatic monocarboxylic acid and aromatic monocarboxylic acid are preferable, because the moisture permeability and the volatility are reduced.

Examples of preferable monocarboxylic acid are listed below, however the present invention is not limited thereto.

A straight or branched chain carboxylic acid having 1 to 32 carbon atoms is preferably employed as aliphatic monocarboxylic acid. The number of carbon atoms is more preferably from 1-20, and specifically preferably from 1-10. The addition of acetic acid is preferable for raising the compatibility with a cellulose acetate, and the mixing of acetic acid with another carboxylic, acid is also preferable.

As the preferable aliphatic monocarboxylic acid, saturated fatty acids such as acetic acid, propionic acid, butylic acid, valeric acid, caproic acid, enantic acid, caprylic acid, pelargonic acid, capric acid, 2-ethyl-hexane acid, undecylic acid, lauric acid, tridecylic acid, myristic acid, pentadecylic acid, palmitic acid, heptadecylic acid, stearic acid, nonadecanic acid, arachic acid, behenic acid, lignocelic acid, cerotic acid, heptacosanic acid, montanic acid, melisic acid and lacceric acid; and unsaturated fatty acids such as undecylenic acid, oleic acid, sorbic acid, linolic acid, linolenic acid and arachidonic acid can be exemplified.

Examples of preferable alicyclic carboxylic acid include cyclopentene carboxylic acid, cyclohexane carboxylic acid, cyclooctane carboxylic acid and derivatives thereof Examples of preferable aromatic carboxylic acid include: ones formed by introducing 1 to 3 alkyl groups or alkoxy groups such as methoxy group or ethoxy group into the benzene ring of benzoic acid such as benzoic acid and toluic acid; an aromatic monocarboxylic acid having two or more benzene rings such as biphenylcarboxylic acid, naphthalene carboxylic acid and tetralin carboxylic acid and derivatives of them. Of these, benzoic acid is specifically preferable.

The molecular weight of the polyalcohol is preferably from 300 to 1,500, and more preferably from 350 to 750 though the molecular weight is not specifically limited. Larger molecular weight is preferable for reducing volatility, while smaller molecular weight is preferable in view of the moisture permeability and compatibility with cellulose acetate.

The carboxylic acid to be employed in the polyalcohol ester may be one kind or a mixture of two or more kinds of them. OH groups in the polyalcohol ester may be completely esterified or may be partially esterified and a part of OH groups may be left as OH group.

Specific examples of the polyalcohol ester are listed below.

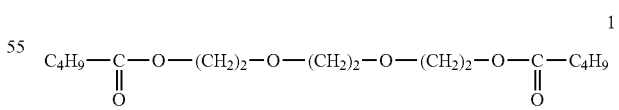

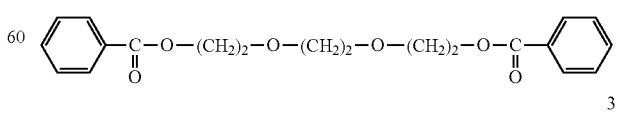

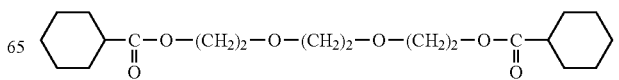

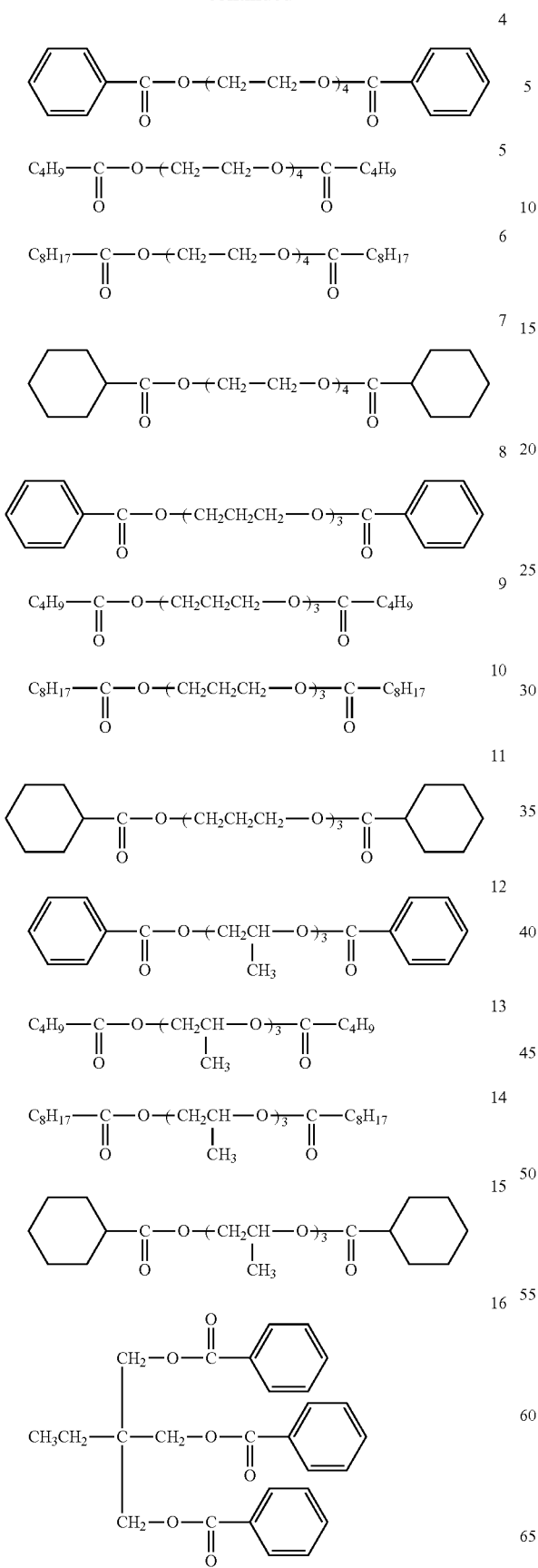
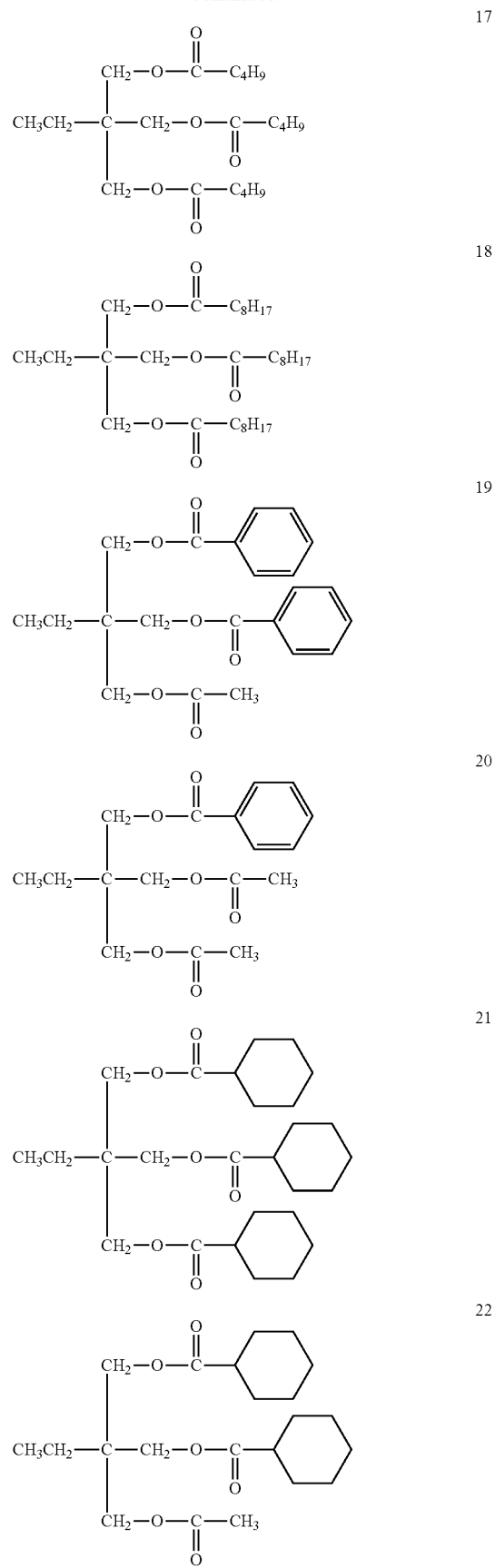

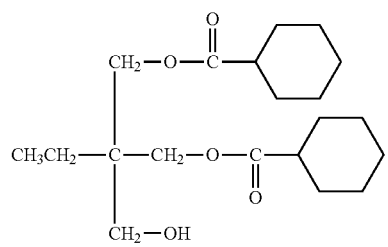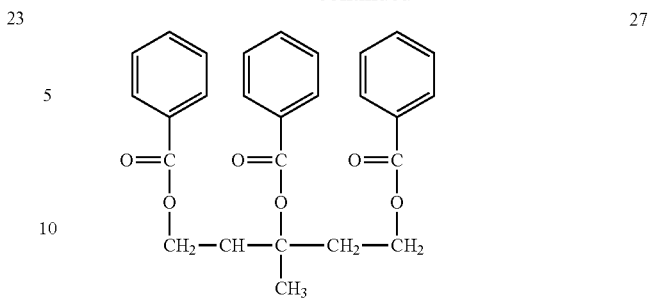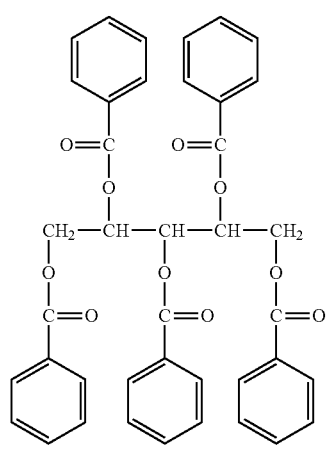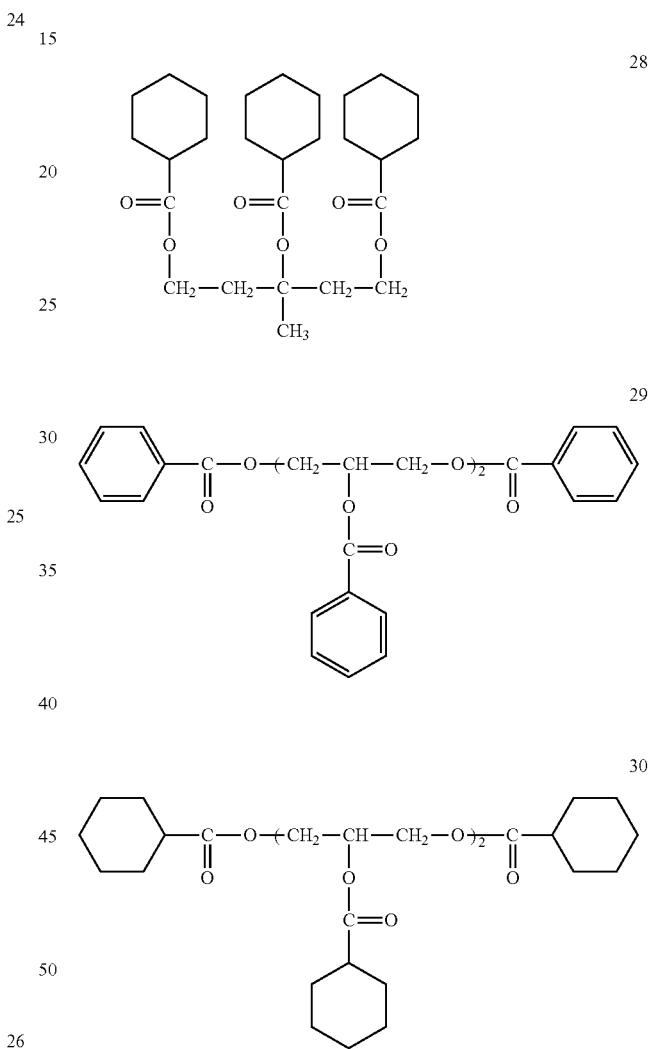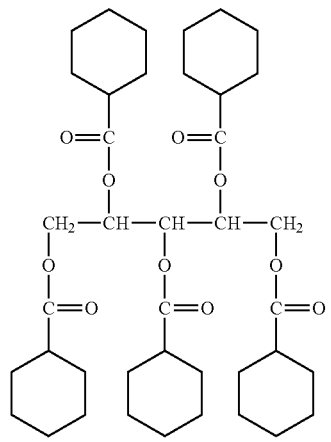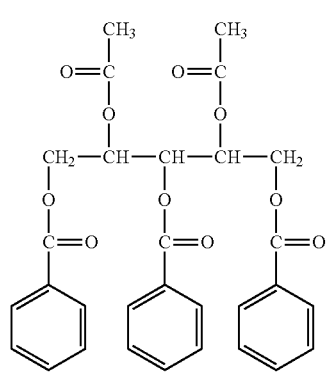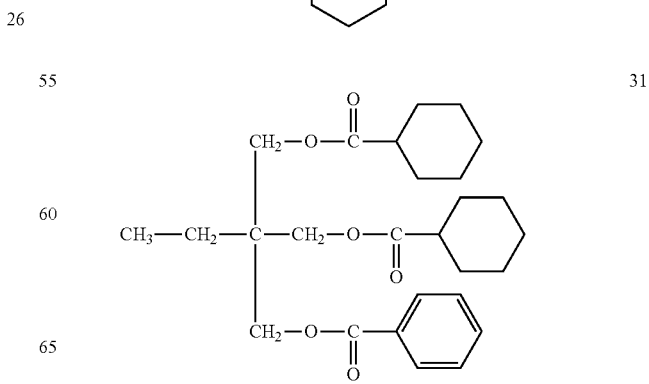

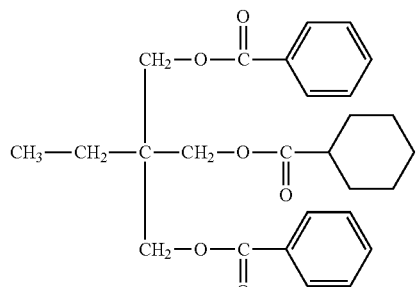

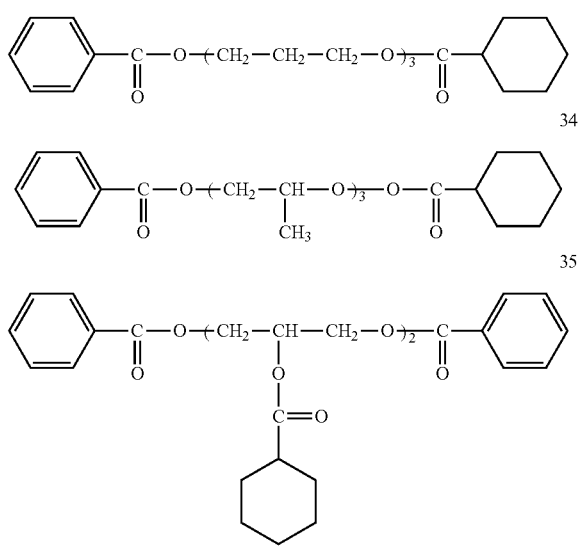

Alkylphthalylalkyl glycolates are preferably used as glycolate plasticizer, however glycolate plasticizer is not limited thereto.

Examples of an alkylphthalylalkyl glycolate include: methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, methylphthalylbutyl glycolate, ethylphthalylbutyl glycolate, butylphthalylmethyl glycolate, butylphthalylethyl glycolate, propylphthalylbutyl glycolate, butylphthalylpropyl glycolate, methylphthalyloctyl glycolate, ethylphthalyloctyl glycolate; octylphthalylmethyl glycolate and octylphthalylethyl glycolate Examples of a phthalate plasticizer include: diethyl phthalate, dimethoxyethyl phthalate, dimethyl phthalate, dioctyl phthalate, dibutyl phthalate, di-2-ethylhexyl phthalate, dioctyl phthalate, dicyclohexyl phthalate and dicyclohexyl terephthalate.

Examples of a citrate plasticizer include: acetyltrimethyl citrate, acetyltriethyl citrate and acetyltributyl citrate.

Examples of a fatty acid ester plasticizer include: butyl oleate, methy acetyl ricinoleate and dibutyl sebacate.

Examples of a phosphate plasticizer include: triphenyl phosphate, tricresyl phosphate, cresyl diphenyl phosphate, octyl diphenyl phosphate, diphenyl biphenyl phosphate, trioctyl phosphate and tributyl phosphate.

A polycarboxylate compound is preferable an ester comprising polycarboxylic acid having divalence or more preferably 2-20 valences and alcohol. Aliphatic polycarboxylic acid preferably has 2-20 valences. In case of aromatic polycarboxylic acid and alicyclic polycarboxylic acid, 3-20 valences are preferable.

Polycarboxylic acid is represented with the following Formula (b).

   Formula (b):

wherein $R_{12}$ represents an organic group having a valence of (m1+n1), m1 represents a positive integer of two or more, n1 represents an integer of 0 or more, COOH group represents a carboxyl group and OH group represents an alcoholic and/or a phenolic hydroxyl group.

Examples of preferable polycarboxylic acid are listed below, however the present invention is not limited thereto.

Preferable examples of polycarboxylic acid include: aromatic polycarboxylic acid or derivatives thereof having 3 or more valences such as trimellitic acid, trimesic acid, and pyromellitic acid; aliphatic polycarboxylic acid such as succinic acid, adipic acid, azelaic acid, sebacic acid, oxalic acid, fumaric acid, maleic acid, tetrahydrophthalic acid; and oxy polycarboxylic acid such as tartaric acid, tartronic acid, malic acid, and citric acid. Of these, oxy polycarboxylic acid is preferable in view of reducing volatility.

Well-known alcohols and phenols are employable as polycarboxylic acid ester compound, without limitation.

A straight or branched chain saturated or unsaturated alcohol having 1 to 32 carbon atoms is preferably employed. The number of carbon atoms is more preferably from 1 to 20, and specifically preferably from 1 to 10.

Further, also preferably employable are alicyclic alcohols or derivatives thereof such as cyclopentanol or cyclohexanol; and aromatic alcohols or derivatives thereof such as benzy alcohol or cinnamyl alcohol.

In case of using oxy polycarboxylic acid as polycarboxylic acid, an alcoholic and/or a phenolic hydroxyl group of oxy polycarboxylic acid may be esterified by monocarboxylic acid. Examples of preferable monocarboxylic acid are listed below, however the present invention is not limited thereto.

Carboxylic acid having a straight or branched chain having 1 to 32 carbon atoms is preferably employed as aliphatic monocarboxylic acid. The number of carbon atoms is more preferably from 1 to 20, and specifically preferably from 1 to 10.

As the preferable aliphatic monocarboxylic acid, saturated fatty acids such as acetic acid, propionic acid, butylic acid, valeric acid, caproic acid, enantic acid, caprylic acid, pelargonic acid, capric acid, 2-ethyl-hexane acid, undecylic acid, lauric acid, tridecylic acid, myristic acid, pentadecylic acid, palmitic acid, heptadecylic acid, stearic acid, nonadecanic acid, arachic acid, behenic acid, lignocelic acid, cerotic acid, heptacosanic acid, montanic acid, melisic acid and lacceric acid; and unsaturated fatty acids such as undecylenic acid, oleic acid, sorbic acid, linolic acid, linolenic acid and arachidonic acid can be exemplified.

Examples of preferable alicyclic monocarboxylic acid include cyclopentane carboxylic acid, cyclohexane carboxylic acid, cyclooctane carboxylic acid and derivatives thereof.

Examples of preferable aromatic monocarboxylic acid include ones formed by introducing an alkyl group into the benzene ring of benzoic acid such as benzoic acid and toluic acid, an aromatic monocarboxylic acid having two or more benzene rings such as biphenylcarboxylic acid, naphthalene carboxylic acid and tetralin carboxylic acid and derivatives thereof. Of these, acetic acid, propionic acid and benzoic acid is specifically preferable.

The molecular weight of the polycarboxylic acid ester compound is preferably from 300 to 1,000, and more preferably from 350 to 750 though the molecular weight is not specifically limited. Larger molecular weight is preferable for reducing volatility, while smaller molecular weight is preferable in view of the moisture permeability and compatibility with cellulose acetate.

The polycarboxylic acid ester compound used in the present invention may be one kind or a mixture of two or more kinds of them.

The acid value of the polycarboxylic acid ester compound used in the present invention is preferably not more than 1 mgKOH/g and more preferably not more than 0.2 mgKOH/g. When acid value is within the above range, variation of retardation against environmental change can be preferably inhibited.

Herein, "acid value" means the milligrams of potassium hydroxide required to neutralize the acid (carboxyl group existing in a specimen) included in 1 g of sample. The acid value and the hydroxyl value are measured based on JIS K0070.

Specific preferable examples of polycarboxylic acid ester compounds will be listed below, however the present invention is not limited thereto.

Examples of polycarboxylic acid ester compounds include: triethyl citrate, tributyl citrate, acetyltriethyl citrate (ATEC), acetyltributyl citrate (ATBC), henzoyltributyl citrate, acetyltriphenyl citrate, acetyltribenzyl citrate, dibutyl tartrate, diacetyl dibutyl tartrate, tributyl trimellitate, and tetrabutyl pyromellitate.

(Ultraviolet Absorber)

The cellulose acetate film B according to the present invention may contain an ultraviolet absorber. An ultraviolet absorber is aimed to improve durability by absorbing ultraviolet rays not longer than 400 nm. Specifically, the transmittance of light at a wavelength of 370 nm is 10% or less, more preferably 5% or less, and further more preferably 2% or less.

The ultraviolet absorber utilized in the present invention is not specifically limited and includes such as an oxybenzophnone compound, a benzotriazole compound, a sarycic acid ester compound, a benzophenone compound, a cyanoacrylate compound, a triazine compound, a nickel complex salt compound and an inorganic powder.

For example listed are 5-chloro-2-(3,5-di-sec-butyl-2-hydroxylphenyl)-2H-benzotriazole, (2-2H-benzotriazole-2-yl)-6-(straight chain and branched dodecyl)-4-methylphenol, 2-hydroxy-4-benzyloxybenzophenone and 2,4-benzyloxy-benzophenone; and also listed and preferably utilized are Tinuvins, such as Tinuvin 109, Tinuvin 171, Tinuvin 234, Tinuvin 326, Tinuvin 327 and Tinuvin 328, which are available on the market from Ciba Specialty Chemicals.

Ultraviolet absorbers utilized in the present invention are preferably a benzotriazole ultraviolet absorber, a benzophenone ultraviolet absorber and a triazine t ultraviolet absorber, and specifically preferably a benzotriazole ultraviolet absorber and a benzophenone ultraviolet absorber.

In addition to these, a disc form compound such as a compound having a 1,3,5-hiazine ring is preferably utilized as an ultraviolet absorber.

The polarizing plate protective film according to the present invention preferably contains two or more kinds of ultraviolet absorbers.

Further, a polymer ultraviolet absorber may also he preferably utilized as an ultraviolet absorber, and polymer type ultraviolet absorbers described in JP-A No. 6-148430 are specifically preferably utilized.

As an addition method of an ultraviolet absorber, an ultraviolet absorber may be added into a dope after having been dissolved in an organic solvent, for example, alcohols such as methanol, ethanol and butanol; organic solvents such as methylene chloride, methyl acetate, acetone and dioxane; and a mixed solvent thereof, or may be directly added into a dope composition.

Those insoluble in an organic solvent, such as inorganic powder, will be added into a dope after having been dispersed in an organic solvent and cellulose ester by use of such as a dissolver or a sand mill.

The using amount of an ultraviolet absorber is not uniform depending on a type and a using condition of an ultraviolet absorber, however, in the case of the dry layer thickness of polarizing plate protective film of 30 to 200 μm, it is preferably 0.5 to 10% by mass and more preferably 0.6 to 4% by mass, based on the mass of the polarizing plate protective film.

(Antioxidant)

An antioxidant is also called as a deterioration-preventing agent. When a liquid crystal display is stored in a high temperature-high humidity condition, the cellulose acetate film may be deteriorated.

An antioxidant is preferably contained in the foregoing cellulose acetate film since an antioxidant has a function to retard or prevent decomposition of the cellulose acetate film due to, for example, halogen contained in the residual solvent in the cellulose acetate film or a phosphoric acid contained in a phosphoric acid-containing plasticizer.

As an antioxidant, hindered phenol compounds are also preferably employed. Examples of a hindered phenol compound: 2,6-di-t-butyl-p-cresol, pentaerythityl-tetrakis[3-(3, 5-di-t-butyl-4-hydroxyphenyl)propionate], triethylene glycol-bis[3-(3-t-butyl-5-methyl-4-hydroxyphenyl) propionate], 1,6-hexanediol-bis[3-(3,5-di-t-butyl-4-hydroxyphenyl)pmpionate], 2,4-bis(n-octyl)-6-(4-hydroxy-3,5-di-t-butylanilino)-1,3,5-triazine, 2,2-thio-diethylene-bis [3-(3,5tbutyl-4-hydroxyphenyl)propionate], octadecyl-3-(3, 5-di-t-butyl-4-hydroxyphenyl)propionate, N,N'-hexamethylene-bis(3,5-di-t-butyl-4-hydroxy-4-hydroxy-hydrocinnamide), 1,3,5-trimethyl-2,4,6-tris(3,5-di-t-butyl-4-hydroxybenzy)benzene and tris-(3,5-di-t-butyl-4-hydroxybenzyl)-isocyanurate.

Specifically, 2,6-di-t-butyl-p-cresol, pentaerythityl-tetrakis[3-(3,5-di-t-butyl-4-hydroxyphenyl)propionate] and triethylene glycol-bis[3-(3-t-butyl-5-methyl-4-hydroxyphenyl) propionate] are preferred. Further, a hydrazine metal inactivation agent such as N,N'-bis[3-(3,5-di-t-butyl-4-hydroxyphenyl)propionyl]hydrazine or a phosphorus-containing processing stabilizing agent such as tris(2,4-di-t-butylphenyl)phosphite may be used in combination.

The adding amount of such a compound is preferably 1 ppm to 1.0%, and more preferably from 10 ppm to 1,000 ppm by mass based on the mass of the cellulose derivative.

(Microparticles)

The cellulose acetate film of the invention can contain microparticles in order to improve handling property. Examples of the microparticles include: inorganic particles such as silicon dioxide, titanium dioxide, aluminum oxide, zirconium oxide, calcium carbonate, kaolin, talc, calcinated calcium silicate, hydrated calcium silicate, aluminum silicate, a magnesium silicate, and calcium phosphate; and crosslinked polymer particles. Of these, silicon dioxide is specifically preferable because haze of the film may be decreased.

The primary particle diameter of particles incorporated in cellulose acetate film utilized in the present invention is preferably not more than 20 nm, more preferably 5-16 ran and specifically preferably 5-12 nm.

These particles are preferably contained in retardation film by forming secondary particles having a particle diameter of 0.1-5 μm, and preferable mean particle diameter is 0.1-2 μm and more preferably 02-0.6 μm. This method can provide embossing having a height of approximately 0.1-1.0 μm on the film surface, and thereby the film surface can be provided with a suitable sliding property.

In measurement of a primary mean particle diameter of particles utilized in the present invention, the particles were observed through a transmission electron microscope (at a magnification of 500,000-2,000,000 times) to determine the primary particle diameter as an average value from observation of 100 particles.

The apparent specific gravity of particles is preferably not less than 70 g/liter, more preferably 90-200 g/liter and specifically preferably 100-200 g/liter. The larger is the apparent specific gravity, dispersion having the higher concentration can be prepared, which is preferable because of improved haze and less aggregation, and is specifically preferable at the time of preparation of a dope having a high solid density.

Silicon dioxide particles having a primary particle diameter of not more than 20 nm and an apparent specific gravity of not less than 70 g/liter can be prepared, for example, by combustion of a mixture of gaseous silicon tetrachloride and hydrogen in air at 1000-1200° C. Further, these particles are available on the market under a product name of such as Aerosil 200V and Aerosil R972V (manufactured by Nippon Aerosil Co., Ltd.), which may be utilized.

The above described apparent specific gravity is determined by sampling a predetermined volume of silicon dioxide particles in a messcylinder to measure said weight and is calculated according to the following equation.

Apparent specific gravity (g/liter)=weight of silicon dioxide(g)/volume of silicon dioxide (liter)

A preparation method of a dispersion of particles utilized in the present invention includes, such as the following three types <<Preparation Method A>>

Dispersion is performed by use of a homogenizer after a solvent and particles have been stirring mixed. This is designated as particle dispersion. The particle dispersion is added into a dope solution to be mixed.<<Preparation Method B>>

Dispersion is performed by use of a homogenizer after a solvent and particles have been stirring mixed. This is designated as particle dispersion. Separately, a small amount of cellulose triacetate is added in a solvent and is dissolved by stirring. The aforesaid particle dispersion is added therein and the resulting solution is mixed. This is designated as a particle additive solution. The particle additive solution is sufficiently mixed with a dope by use of an in-line mixer.

<<Preparation Method C>>

A small amount of cellulose triacetate is added in a solvent and is dissolved by stirring. Particles are added therein and dispersed by use of a homogenizer. This is designated as a particle additive solution. The particle additive solution is sufficiently mixed with a dope by use of an in-line mixer.

Preparation method A is superior in dispersibility of silicon dioxide particles and preparation method C is superior in that silicon dioxide particles are hard to be re-aggregated. Among them, the above-described preparation method B is a preferable method which is superior in both of dispersibility of silicon dioxide particles and re-aggregation resistance of silicon dioxide particles.

<Dispersion Method>

The concentration of silicon dioxide at the time of dispersing silicon dioxide particles by being mixed with a solvent is preferably 5-30% by mass, more preferably 10-25% by mass and most preferably 15-20% by mass. The lower is the dispersion density, there is a tendency of lowering liquid turbidity against the addition amount and it is preferable because of improved haze and minimum aggregation.

A utilized solvent includes preferably methyl alcohol, ethyl alcohol, propyl alcohol, isopropyl alcohol and butyl alcohol as lower alcohols. Solvents other than lower alcohols are not specifically limited; however, preferably utilized are solvents which are employed at the time casting of cellulose acetate.

The addition amount of silicon dioxide particles against cellulose acetate is preferably 0.01-5.0 parts by mass, more preferably 0.05-1.0 parts by mass and most preferably 0.1-0.5 parts by mass. The larger is the addition amount, the superior is a dynamic friction coefficient; while, the smaller is the addition amount, the less is aggregation.

As a homogenizer, an ordinary homogenizer can be utilized. Homogenizers can be roughly classified into a media homogenizer and a media-less homogenizer. For dispersion of silicon dioxide particles, a media-less homogenizer is preferred due to a lower haze. A media homogenizer includes such as a ball mill, a sand mill and a DYNO-MILL.

A media-less homogenizer includes an ultrasonic type, a centrifugal type and a high pressure type, however, a high pressure homogenizer is preferable in the present invention. A high pressure homogenizer is an apparatus to make a special condition such as a high share or high pressure state by passing a composition, comprising particles and a solvent having been mixed, through a fine tube at a high speed.

In the case of processing by a high pressure homogenizer, it is preferable, for example, to set the maximum pressure condition in a fine tube having a diameter of 1-2000 μm of not less than 9.807 MPa and more preferably of not less than 19.613 MPa.

Further, at that time, preferable are those in which the maximum speed of not less than 100 m/sec and the heat transmission rate of not less than 420 kJ/hour.

High pressure homogenizers such as described above include a high pressure homogenizer (product name: Microfluidizer) manufactured by Microfluidics Corporation or Nanomizer manufactured by Nanomizer Corp., in addition to Manton-Gaulin type high pressure homogenizers such as a homogenizer manufactured by rzumi Food Machinery Co., Ltd. and UHN-01 manufactured by Sanwa Machine Co., Inc.

Further, it is preferable to cast a dope containing particles so as to directly contact to a casting support, because film having a high sliding property and a low haze can be prepared.

Further, functional thin layer such as hard coat layer or anti-reflection layer is provided after the film has been peeled off after casting, dried and wound as a roll form. The resulting film is generally subjected to a packaging process to protect the product from dirt and dust adhesion due to static electricity until the following process or shipment.

The packaging material is not specifically limited provided achieving the above object, however, is preferably those not to disturb vaporization of a residual solvent from film. Specifically, listed are such as polyethylene, polyester, polypropylene, nylon, polystyrene, paper, various types of nonwoven fabric. Those comprising fiber of a mesh cloth form are more preferably utilized.

<Manufacturing Method of Cellulose Acetate Film>

The manufacturing method of the cellulose acetate film of the present invention will now be explained.

Film manufactured either by solution casting method or by melt casting method may be preferably employed to the cellulose acetate film of the present invention.

The manufacturing method of the cellulose acetate film of the present invention by solution casting method contains the processes of a dope preparing process in which cellulose acetate and an additive are dissolved into solvent to prepare dope, a casting process in which a dope is cast on an endless metal support, a drying process in which a cast dope is dried to form a web, a peeling process in which a dried web is peeled from the metal support, a stretching process or a width keeping process, a further drying process, and a winding process of the prepared film.

The dope preparation process will now be explained. In the dope preparation process, a higher content of cellulose acetate in the dope is preferable since duration of the drying process following the casting process is shortened, however, a too high content may result in loss of filtration accuracy. Preferable content of cellulose acetate is from 10-35% by mass and more preferably from 15-25% by mass.

A solvent may be used alone, however, two or more solvents may also be used together. A mixture of a good solvent and a poor solvent is more preferably used to increase manufacturing efficiency. A mixed solvent being rich in a good solvent is preferable to increase solubility of cellulose acetate.

The preferable mixing ratios are from 70 to 98% by mass of a good solvent, and from 2 to 30% by mass of a poor solvent. Herein, a good solvent is described as being capable of dissolving cellulose acetate with a single use, and a poor solvent as being incapable of dissolving nor swelling cellulose acetate alone.

Sometimes, a solvent works as a good solvent of a cellulose acetate, and sometimes as a poor solvent depending on the average acylation degree (degree of acyl substitution) of the cellulose acetate.

Example of good solvents used in the present invention include: an organic halide (such as methylene chloride), dioxolanes, acetone, methyl acetate and methyl acetoacetate, however, the present invention is not specifically limited thereto. Of these, methylene chloride and methyl acetate are specifically preferable.

Examples of poor solvents used in the present invention include: methanol, ethanol, n-butanol, cyclohexane and cyclohexanone, however, the present invention is not specifically limited thereto. A dope may preferably contain from 0.01 to 2% by mass of water.

Solvent evaporated from film by drying in a film forming process is recovered and reused to dissolve cellulose acetate.

The recovered solvent sometimes may include a small amount of additives in cellulose acetate such as a plasticizer, polymer, or monomer. However, even when these are included, it may be preferably reused. If necessary, it may be reused through purification.

In the process of preparing a dope, cellulose acetate is dissolved using a common method. Dissolving cellulose acetate at a higher temperature is possible when the heating is carried out under a higher pressure.

Formation of a gel or an insoluble agglomerate (known as "Marnako" in Japanese which represents insoluble residue when powder is dissolved in a solvent) may be avoided when the dissolving temperature is higher than the ambient pressure boiling point of the mixed solvents, and simultaneously the temperature is in the range where the mixed solvents do not boil under the applied higher pressure.

The following dissolving method is also preferable, in which cellulose acetate is swollen in a mixture of good and poor solvents followed by adding good solvents to dissolve the swollen cellulose acetate Pressure may be applied by injecting an inert gas such as nitrogen or by increasing the vapor pressure of the solvents by heating. Heating is preferably carried out from the outside of the container. A jacket type heater is preferable because the temperature is easily controlled.

A higher dissolving temperature is preferable with respect to the solubility of the cellulose acetate, however, too high a temperature may lower the productivity because the pressure also becomes very high.

The dissolving temperature is preferably 45-120° C., more preferably 60-110° C. and still more preferably 70-105° C. The pressure should be controlled not to allow boiling at the set temperature.

A low temperature dissolution method is also preferably utilized, by which cellulose acetate is successfully dissolved in solvents such as methyl acetate.

In the next process, the cellulose acetate solution thus prepared is filtered using an appropriate filter material. A filter material with a smaller absolute filtration accuracy is more preferable for removing insoluble materials, however, too small a filtration accuracy easily causes clogging up of the filter.

The absolute filtration accuracy of the filter is preferably not larger than 0.008 mm, more preferably 0.001-0.008 mm and still more preferably 0.003-0.006 mm.

The filter material used in the present invention is not specifically limited, and plastic filters such as polypropylene and Teflon (registered trademark) as well as metal filters such as stainless steel are preferable, since these materials are free from peeling of a fiber, which may occur when fibrous material is used.

Impurities and, specifically, luminescent foreign materials contained in the cellulose acetate are preferably diminished or entirely removed by filtering.

"Luminescent foreign materials" denote impurities which are observed as bright spots when an optical film is placed between two polarizing plates arranged in a crossed Nicols state, illuminated with a light from one side and observed from the other side. The number of luminescent foreign materials of larger than 0.01 mm in diameter is preferably less than 200 per $cm^2$.

The number of luminescent foreign materials of larger than 0.01 mm in diameter is more preferably less than 100 per $cm^2$ and still more preferably from 0 to 10 per $cm^2$. The number of luminescent foreign materials of less than 0.01 mm in diameter is preferably minimal.

The dope may be filtered by any common method. One of these preferable filtering methods is to filter the dope at temperatures which are higher than the ambient pressure boiling point of the mixed solvents, and simultaneously in the range where the mixed solvents do not boil under a higher pressure. This method is preferable because the pressure difference between before and after filtering is reduced.

The filtering temperature is preferably from 45 to 120° C., more preferably from 45 to 70° C., and still more preferably from 45 to 55° C.

The pressure applied during filtering is preferably low, being preferably not more than 1.6 MPa, more preferably not more than 1.2 MPa and still more preferably not more than 1.0 MPa.

Casting of a dope will be explained below:

A metal support polished to a mirror finished surface is used in the casting process. A polished stainless steel belt or a plated cast drum is used as a metal support.

The width of the support is preferably from 1 to 4 m. The surface temperature of the metal support is preferably from −50° C. to a temperature just below the boiling point of the solvent A relatively high temperature of the support is more preferable because the web is more quickly dried, however, too high a temperature may cause foaming or loss of flatness of the web.

The temperature of the support is appropriately determined in the range of 0-55° C., however, preferably 25-50° C. Another preferable method is that a web is gelled by cooling the drum followed by peeling the web from the drum while the web still contains much solvent.

The method to control the temperature of the support is not specifically limited and a method of blowing warm or cool air onto the support or to apply warm water on the rear side of the support is acceptable. The warm water method is more preferable because the temperature of the metal support becomes stable in a shorter time due to more efficient thermal conduction. In the case when warm air is used, the air temperature should be higher than the desired temperature of the support In order to obtain a cellulose acetate film with a sufficient flatness, the residual solvent content of the web when it is peeled from a metal support is preferably 10-150% by mass, however, it is more preferably 20-40% by mass or 60-130% by mass. The residual solvent content is specifically more preferably 20-30% by mass or 60-120% by mass.

The residual solvent content of the web is defined by the following expression:

Residual solvent content (% by mass)=$\{(M-N)/N\} \times 100$ wherein M represents the mass of a sample of the web collected during or after the manufacturing process, and N represents the mass of the same sample after it was dried at 115° C. for 1 hour.

In the drying process of a cellulose acetate film, the film is peeled from the support and further dried until the residual solvent preferably decreases below not more than 1% by mass, more preferably not more than 0.1% by mass, but specifically preferable 0-0.01% by mass.

The peeled web is generally dried by a roll drying method (the web is passed through many rolls alternately provided up and down in a staggered array), or by a tenter method while the web is being transported.

In the manufacturing of cellulose acetate film of the present invention, the web may be preferably stretched in the film lateral (traverse) direction by a tenter method in which both edges of the web are clipped. The web is preferably peeled from the support with a tension of not more than 300 N/m.

The means to dry the web is not specifically limited, and, for example, heated air, infrared rays, a heated roll and microwave are applicable. With respect to the easiness, heated air is preferable.

The drying temperature in the drying process is preferably increased stepwise in the range of 40-200° C.

The thickness of the cellulose acetate film is not specifically limited, however is 10-200 μm, more preferable 10-100 μm, and specifically preferable 20 -60 μm.

The width of the cellulose acetate film of the present invention is 1-4 m, preferable 1.4-4 m, and specifically preferable 1.6-3 m. In case of exceeding 4 m, it becomes hard to conveyance.

In order to provide the prescribed retardation value Ro and Rt, it is preferable that the cellulose acetate film comprises the constitution of the present invention and also a refractive index is controlled by controlling a conveyance tension and by stretching.

For example, the retardation value can be variable by decreasing or increasing a longitudinal tension.

The stretching may be carried out by biaxial stretching or uniaxial stretching successively or simultaneously in the longitudinal (film transporting) direction and in a direction perpendicular thereto, namely in the lateral direction.

The stretching ratio in biaxial directions perpendicular to each other is preferably 0.8-1.5 in the film casting direction, and 1.1-2.5 in the lateral direction, more preferable 0.8-1.0 in the film casting direction, and 1.2-2.0 in the lateral direction.

The web is preferably subjected to be stretched in the temperature range of 120° C.-200° C., more preferably 150° C.-200° C., and most preferably over 50° C. and not more than 190° C.

It may be preferable to sir etch a film under the condition where the content of the residual solvent in the film is 20 to 0%, and more preferably 15 to 0%.

More concretely, the film is preferably stretched under the condition that the content of the residual solvent is 11% at 155° C., or the content of the residual solvent is 2% at 155° C. Otherwise, the content of the residual solvent is 11% at 160° C., or the content of the residual solvent is less than 1% at 160° C.

A method to stretch a web is not specifically limited. For example, listed a method to stretch in the longitudinal direction by making a circumferential speed difference among plural rolls and utilizing the roll circumferential speed difference among them, a method to stretch in the longitudinal direction by fixing the both edges of a web with clips or pins and widening the intervals between clips and pins toward the proceeding direction, a method to stretch by widening similarly along the width direction, or a method to stretch in the both of longitudinal and width directions by simultaneously widening along the longitudinal and width directions. Of course, these methods may be used in combination.

In a so-called tenter method, it is preferable that a smooth stretching can be performed by driving the clip portion by a linear drive method which reduces risk to such as break It is preferable to perform the width holding or stretching in the width direction by a tenter, which may be either a pin tenter or a clip tenter.

The slow axis or the fast axis of the cellulose acetate film of the present invention preferably is present in a film plane and θ1 is preferably not less than −1° and not more than +1°, and more preferably not less than −0.5° and not more than +0.5°, provided that θ1 represents the angle against the casting direction.

This θ1 can be defined as an orientation angle, and measurement of θ1 can be performed by use of automatic birefringent meter KOBRA-21ADH (Oji Scientific Instruments). To satisfy the above-described relationships by θ1 can contributes to obtain a high luminance and to restrain or prevent light leak, and to obtain faithful color reproduction in a color liquid display.

(Physical Properties of Cellulose Acetate Film)

The moisture permeability of the cellulose acetate film according to the present invention is preferably 300 to 1,800 g/m$^2$·24 h, more preferably 400 to 1,500 g/m$^2$·24 h and specifically preferably 400 to 1300 g/m$^2$·24 h at 40° C., 90% RH. The moisture permeability can be measured according to a method described in JIS Z 0208.

The elongation percentage of the cellulose acetate film according to the present invention is preferably 10 to 80% and more preferably 20 to 50%.

The visible light transmittance of the cellulose acetate film according to the present invention is preferably not less than 90% and more preferably not less than 93%.

The haze of the cellulose acetate film according to the present invention is preferably less than 1% and specifically preferably 0 to 0.1%.

Further, i f a liquid crystal layer is coated on the cellulose acetate film according to the present invention, retardation values extending over a more wide range may be obtained.

<Polarizing Plate>

The cellulose acetate film according to the present invention may be applied to a polarizing plate and to a liquid crystal display device employing thereof.

A polarizing plate of the present invention is characterized by being pasted with the aforesaid cellulose acetate film according to the present invention on at least one surface of a polarizer. A liquid crystal display device of the present invention is characterized in that a polarizing plate according to the present invention is pasted up on at least one liquid crystal cell surface via an adhesive layer.

The polarizing plate of the present invention can be prepared by an ordinary method. The polarizer side of the cellulose acetate film according to the present invention is subjected to an alkaline saponification treatment; is preferably pasted up by use of a completely saponificated type polyvinyl alcohol aqueous solution on at least one surface of a polarizer which has been prepared by being immersed into an iodine solution and subsequently being stretched.

On the other surface, said optical compensation film may be utilized or another film may be utilized.

For example, a cellulose acetate film (such as Konica Minolta TAC KC8UX, KC5UX, KC8UCR3, KC8UCR4, KC8UCR5, KC8UY, KC4UY, KC4UE, KC8UE, KC8UY-HA, KC8UX-RHA, KC8UXW-RHA-C, KC8UXW-RHA-NC, and KC4UXW-RHA-NC manufactured by Konica Minolta Opto, Inc.) available on the market is also preferably utilized.

Onto the polarizing plate used for the surface side of a display unit, it is desirable to provide an antireflection layer, an antistatic layer, an antifouling layer, or a back coat layer besides an antiglare layer or a clear hard coat layer.

A polarizer as a primary constitution clement is an element to pass light of a polarized wave plane of a predetermined direction, and a typical polarizer known at present is polyvinyl type polarizing film, which includes polyvinyl alcohol film dyed with iodine and one dyed with dichroic dye.

As a polarizer, utilized is one in which a polyvinyl alcohol aqueous solution is cast, and the cast film is uniaxially stretched and dyed, or is uniaxially stretched after having been dyed, preferably followed by being subjected to a durability treatment with a boron compound. The layer thickness of a polarizer is preferably 5 to 30 μm and specifically preferably 10 to 20 μm.

Further, ethylene modified polyvinyl alcohol which is described in such as JP-A 2003-248123 and JP-A 2003-342322 and has an ethylene unit content of 1 to 4 mol %, a polymerization degree of 2,000 to 4,000 and a saponification degree of 99.0 to 99.99 mol % is also preferably utilized.

Of these, ethylene modified polyvinyl alcohol having a hot water breaking temperature of 66 to 73° C. is preferably utilized.

Further, a difference of hot water breaking temperature between two points remote from each other by 5 cm in the film TD direction is preferably not more than 1° C. and more preferably not more than 0.5° C. in a difference of hot water breaking temperature between two points remote from each other by 1 cm in the film TD direction, in order to reduce color spottiness.

A polarizer utilizing this ethylene modified polyvinyl alcohol film is excellent in polarizing ability and durability, as well as exhibits few color spottiness, and is specifically preferably applied in a large size liquid crystal display device.

A polarizer prepared in the above manner, generally on the both surface or one surface of which protective film is pasted up, is utilized as a polarizing plate. An adhesive employed at the time of paste up includes a PVA type adhesive and an urethane type adhesive. Of these, a PVA type adhesive is preferably utilized. Polarizing plate protective film is preferably used in the polarizing plate of the present invention.

<Liquid Crystal Display Device>

By using the polarizing plate of the present invention for a liquid crystal display device, a variety of display devices excellent in visibility are provided.

The cellulose acetate film of the present invention is usable for the liquid crystal display devices of various drive modes, such as STN, TN, OCB, HAN, VA (MVA, PVA), IPS and OCB.

Of these, preferable is an application of the polarizing plate of the present invention to a VA (MVA, PVA) mode liquid crystal display device.

Especially, even if a liquid crystal display device has a large screen more than 30 type, it is possible to obtain a liquid crystal display device in which there are few environmental variations, light leakage is reduced, and visibility, such as color tone unevenness and front contrast is excellent.

EXAMPLES

Hereafter, the present invention will be explained with reference to examples, however, the present invention is not limited thereto.

Example 1

<Preparation of Cellulose acetate film 101>
<Particle Dispersion Liquid 1>

| | |
|---|---|
| Particle (Aerosil R972V manufactured by Japan Aerosil) | 11 parts by mass |
| Ethanol | 89 parts by mass |

The substances listed above were agitated and mixed by a dissolver for 50 minutes and then dispersed by the use of Manton-Gaulin homogenizer.

<Particle Addition Liquid 1>

The particle dispersion liquid 1 was slowly added into a solution tank storing methylene chloride, while being agitated sufficiently. Further, the solution was dispersed by an attritor so that the particle size of secondary particles became a predetermined size. The resultant solution was filtered by the use of Fine Met NF manufactured by Nippon Seisen Co., Ltd., whereby particle addition liquid 1 was prepared.

| | |
|---|---|
| Methylene chloride | 99 parts by mass |
| Particle dispersion liquid 1 | 5 parts by mass |

A main dope liquid of the following composition was prepared. First, methylene chloride and ethanol were added to a pressure solution tank. Cellulose acetate C was supplied into the pressure solution tank storing a solvent while being agitated. Further, it was dissolved completely while being heated and agitated. The resultant liquid was filtered by the use of Azumi filter paper No. 244 manufactured by Azumi Filter Paper Co., Ltd., whereby the main dope liquid was prepared.

<Composition of the Main Dope Liquid>

| | |
|---|---|
| Methylene chloride | 340 parts by mass |
| Ethanol | 64 parts by mass |
| Cellulose acetate C (produced by Eastman Kodak) | 100 parts by mass |
| Ester compound 2-16 of the present invention | 6.0 parts by mass |
| Saccharide ester compound 1-2 of the present invention | 6.0 parts by mass |
| Particle addition liquid 1 | 1 parts by mass |

The above substances were put into a sealed container and dissolved while being agitated, whereby a dope liquid was prepared. Subsequently, by the use of an endless belt type casting apparatus, the dope liquid was uniformly cast on a stainless steel belt support at the temperature of 33° C. with a 1,500 mm width. The temperature of the stainless steel belt was controlled at 30° C.

The solvent was evaporated on the stainless belt support until the remaining solvent amount in the cast film became 75%, and then the cast film was peeled from the stainless steel belt support with a peeling force of 130 N/m.

The peeled cellulose acetate film was stretched 36% in the width direction by the use of a tenter under the application of heat of 160° C. The residual solvent at the time of starting the stretching was 15%.

Subsequently, the drying of the cellulose acetate film was completed while the cellulose ester was being conveyed through a drying zone convey with many rolls. A drying temperature was 130° C. and conveying tension was made 100 N/m.

As mentioned above, cellulose acetate film 101 with a dried film thickness of 40 μm was obtained

TABLE 1

| Cellulose acetate | Acetylation degree |
|---|---|
| A | 50 |
| B | 51 |
| C | 55 |
| D | 56 |
| E | 57 |

<Preparation of Cellulose Acetate Films 102 to 130>

Cellulose acetate films 102 to 130 were prepared in the same manner as Cellulose acetate film 101 except that dope composition and preparation condition were changed as shown in Table 2.

<Preparation of Cellulose Acetate Films 201 to 218>

Cellulose acetate films 201 to 218 were prepared in the same manner as Cellulose acetate film 101 except for using cellulose acetate mixture comprising cellulose acetate a having Weight average molecular weight/Viscosity value of 1.2--2.4 and cellulose acetate β having Weight average molecular weight/Viscosity value of 4.4-5.5 as shown in Table 3.

Retardation, haze and intensity of scattered light of resulting sample each were measured in each wavelength according to the following procedure. Results were listed in Tables 2 and 3.

<<Measurement of Retardation Ro and Rt>>

Samples were cut out with a size of 35 mm×35 mm from the obtained films, and moisture conditioned for 2 hours under an ambience of 25° C., 55% RH. Retardation values Ro and Rt were measured by the use of an automatic birefringence analyzer (KOBRA-21ADH manufactured by Oji Scientific Instruments) at a wavelength of 590 nm for each samples.

<<Measurement of Internal Haze>>

According to HS K-6714, the internal haze was measured by the use of a haze meter NDH 2000 type manufactured by Nippon Denshoku.

TABLE 2

| No. of Cellulose acetate film | Dope composition | | | | | | Production condition | | | Optical property | | | |
|---|---|---|---|---|---|---|---|---|---|---|---|---|---|
| | Sugar ester compound | | | | Ester compound | | | | Stretching | Retardation | | | |
| | Species of Cellulose acetate | Species | Distribution of Substitution degree | Parts by mass | Species | Parts by mass | Stretching ratio | Thickness (μm) | Temperature (° C.) | Ro (nm) | Rt (nm) | Inner haze | Remarks* |
| 101 | C | 1-2 | 4-8 | 2.0 | 2-16 | 7.0 | 1.30 | 40 | 160 | 52 | 125 | 0.02 | Inv. |
| 102 | C | 1-3 | 5-8 | 1.0 | 2-14 | 8.0 | 1.35 | 40 | 160 | 57 | 125 | 0.03 | Inv. |
| 103 | C | 1-4 | 4-8 | 1.0 | 2-15 | 10.0 | 1.28 | 45 | 160 | 50 | 130 | 0.02 | Inv. |
| 104 | C | 1-7 | 4-8 | 3.0 | 2-16 | 8.0 | 1.30 | 40 | 160 | 52 | 125 | 0.05 | Inv. |
| 105 | C | 1-8 | 5-8 | 2.0 | 2-17 | 7.0 | 1.30 | 40 | 160 | 52 | 125 | 0.04 | Inv. |
| 106 | C | 1-9 | 5-8 | 1.0 | 2-18 | 10.0 | 1.28 | 45 | 160 | 50 | 130 | 0.03 | Inv. |
| 107 | C | 1-10 | 4-8 | 1.0 | 2-16 | 9.0 | 1.35 | 42 | 158 | 60 | 130 | 0.04 | Inv. |
| 108 | C | 1-11 | 5-8 | 1.0 | 2-14 | 8.0 | 1.28 | 45 | 160 | 50 | 130 | 0.05 | Inv. |
| 109 | C | 1-12 | 5-8 | 2.0 | 2-19 | 7.0 | 1.30 | 40 | 160 | 52 | 125 | 0.03 | Inv. |
| 110 | C | 1-13 | 4-8 | 1.0 | 2-1 | 9.0 | 1.35 | 40 | 160 | 57 | 125 | 0.02 | Inv. |
| 111 | B | 1-14 | 5-8 | 1.0 | 2-4 | 10.0 | 1.28 | 45 | 160 | 50 | 130 | 0.05 | Inv. |
| 112 | B | 1-15 | 5-8 | 3.0 | 2-5 | 7.0 | 1.28 | 41 | 158 | 50 | 125 | 0.04 | Inv. |
| 113 | B | 1-16 | 4-8 | 3.0 | 2-6 | 9.0 | 1.30 | 40 | 160 | 52 | 125 | 0.03 | Inv. |
| 114 | B | 1-17 | 5-8 | 2.0 | 2-2 | 10.0 | 1.28 | 45 | 160 | 50 | 130 | 0.03 | Inv. |
| 115 | D | 1-18 | 5-8 | 1.0 | 2-3 | 7.0 | 1.35 | 42 | 158 | 60 | 130 | 0.04 | Inv. |
| 116 | D | 1-19 | 4-8 | 1.0 | 2-7 | 7.0 | 1.30 | 45 | 160 | 52 | 130 | 0.04 | Inv. |
| 117 | D | 1-20 | 5-8 | 1.0 | 2-8 | 8.0 | 1.30 | 40 | 160 | 52 | 125 | 0.05 | Inv. |
| 118 | D | 1-21 | 5-8 | 2.0 | 2-9 | 9.0 | 1.35 | 40 | 160 | 57 | 125 | 0.03 | Inv. |
| 119 | B | 1-5 | 4-8 | 5.0 | — | — | 1.10 | 38 | 155 | 27 | 68 | 0.06 | Inv. |
| 120 | E | 1-4 | 1-7 | 5.0 | — | — | 1.10 | 38 | 157 | 28 | 65 | 0.07 | Comp |
| 121 | C | 1-6 | 4-8 | 5.0 | — | — | 1.50 | 55 | 165 | 93 | 220 | 0.08 | Comp. |
| 122 | C | 1-6 | 1-8 | 5.0 | — | — | 1.48 | 48 | 163 | 85 | 180 | 0.07 | Comp. |
| 123 | A | 1-8 | 1-8 | 10.0 | 2-14 | 2.0 | 1.48 | 52 | 163 | 83 | 190 | 0.08 | Comp. |

TABLE 2-continued

| No. of Cellulose acetate film | Dope composition | | | | | | Production condition | | | Optical property | | | |
|---|---|---|---|---|---|---|---|---|---|---|---|---|---|
| | Species of Cellulose acetate | Sugar ester compound | | | Ester compound | | Stretching ratio | Thickness (μm) | Stretching Temperature (°C.) | Retardation Ro (nm) | Rt (nm) | Inner haze | Remarks* |
| | | Species | Distribution of Substitution degree | Parts by mass | Species | Parts by mass | | | | | | | |
| 124 | D | 1-6 | 4-8 | 7.0 | 2-15 | 2.0 | 1.48 | 48 | 163 | 85 | 180 | 0.09 | Comp. |
| 125 | C | 1-6 | 1-7 | 8.0 | 2-16 | 3.0 | 1.55 | 65 | 165 | 95 | 305 | 0.11 | Comp. |
| 126 | A | 1-17 | 5-8 | 9.0 | 2-7 | 2.0 | 1.54 | 66 | 165 | 92 | 310 | 0.11 | Comp. |
| 127 | E | 1-20 | 4-8 | 5.0 | — | — | 1.35 | 45 | 158 | 83 | 190 | 0.12 | Comp. |
| 128 | E | 1-3 | 1-7 | 5.0 | — | — | 1.28 | 45 | 160 | 85 | 180 | 0.12 | Comp. |
| 129 | A | 1-6 | 5-8 | 4.0 | — | — | 1.35 | 40 | 158 | 95 | 305 | 0.12 | Comp. |
| 130 | A | 1-1 | 1-8 | 4.0 | — | — | 1.28 | 41 | 158 | 92 | 310 | 0.15 | Comp. |

*Inv.: Inventive example, Comp.: Comparative example

TABLE 3

| No. of Cellulose acetate film | Dope composition Cellulose acetate Weight average molecular Weight/Viscosity | | Optical properties | | | Remarks* |
|---|---|---|---|---|---|---|
| | α | β | Retardation Ro (nm) | Rt (nm) | Internal haze | |
| 201 | 1.3 | 4.6 | 50 | 130 | 0.02 | Inv. |
| 202 | 1.6 | 5.0 | 57 | 125 | 0.03 | Inv. |
| 203 | 1.8 | 5.3 | 57 | 125 | 0.02 | Inv. |
| 204 | 1.2 | 5.5 | 52 | 125 | 0.05 | Inv. |
| 205 | 2.0 | 4.7 | 60 | 130 | 0.04 | Inv. |
| 206 | 2.2 | 4.9 | 50 | 130 | 0.03 | Inv. |
| 207 | 2.3 | 5.2 | 52 | 125 | 0.04 | Inv. |
| 208 | 1.7 | 5.0 | 50 | 130 | 0.05 | Inv. |
| 209 | 2.4 | 4.4 | 52 | 125 | 0.05 | Inv. |
| 210 | 1.9 | 5.0 | 52 | 125 | 0.02 | Inv. |
| 211 | 2.4 | 5.5 | 52 | 125 | 0.05 | Inv. |
| 212 | 1.5 | 5.1 | 52 | 130 | 0.04 | Inv. |
| 213 | 1.9 | 4.5 | 50 | 130 | 0.03 | Inv. |
| 214 | 1.8 | 4.8 | 52 | 125 | 0.03 | Inv. |
| 215 | 1.4 | 4.8 | 60 | 130 | 0.04 | Inv. |
| 216 | 2.2 | 5.3 | 50 | 125 | 0.04 | Inv. |
| 217 | 1.2 | 5.4 | 50 | 130 | 0.05 | Inv. |
| 218 | 2.1 | 5.1 | 57 | 125 | 0.03 | Inv. |

*Inv.: Inventive Example

<Preparation of Polarizing Plates 101 to 130 and 201 to 218>

A polyvinyl alcohol film having a thickness of 120 μm was uniaxially stretched (temperature: 110° C., stretching ratio: 5 times).

The film was immersed in an aqueous solution of 0.075 g iodine, 5 g potassium iodide, and 100 g water for 60 seconds, and then immersed in a 68° C. aqueous solution of 6 g potassium iodide, 7.5 g boric acid and 100 g water. The film was washed and dried to obtain a polarizer film.

Next, the polarizer film and each of the cellulose acetate films 101 to 130 of the present invention were pasted onto the front side and a Konica Minolta TAC KC4UY (cellulose acetate film manufactured by Konica Minolta Opto. Inc.) was pasted on the back side in accordance with the following steps 1 to 5, whereby polarizing plates 101 to 130 and 201 to 218 were prepared.

Step 1: A cellulose acetate film was immersed for 90 seconds in 2 mol/L of sodium hydroxide solution at 60° C. and then washed and dried, whereby a cellulose acetate film 101 to 130 and 201 to 218, the side of which to be pasted to a polarizing element was saponified was obtained.

Step 2: The polarizer film was immersed in a tank of polyvinyl alcohol adhesive having a solid content of 2% by mass for 1 to 2 seconds.

Step 3: Excess adhesive attached to the polarizer film in Step 2 was gently wiped off and then the polarizer film was placed on the cellulose acetate films 101 to 130 and 201 to 218 processed in Step 1.

Step 4: Each of the cellulose acetate films 101 to 130 and 201 to 218 and the polarizer film which were stacked in Step 3, and a cellulose acetate films on the back side was pasted together at a pressure of 20-30 N/cm² and a conveyance speed of approximately 2 m/minute.

Step 5: The samples in which the polarizing cellulose acetate films 101 to 130 and 201 to 218, and Konica Minolta TAC KC4UY were prepared in Step 4 were dried for 2 minutes in a dryer at 80° C., whereby prepared were polarizing plates 101 to 130 and 201 to 218 each corresponding to the cellulose acetate films 101 to 130 and 201 to 218.

<Preparation of a Liquid Crystal Display Device>

A liquid crystal panel to perform viewing angle measurement was prepared as follows, and the characteristics as a liquid crystal display device were evaluated.

The polarizing plates preliminarily pasted on both sides of a 40 type display BRAVIA X1 manufactured by SONY were removed, and the polarizing plates 101 to 130 and 201 to 218 which were prepared as mentioned above were pasted onto both sides of a glass surface of a liquid crystal cell respectively.

At this time, the polarizing plates were pasted in such a direction that the plane of the cellulose acetate film of the present invention became the liquid crystal cell side and the absorption axis was directed to the same direction as the preliminarily pasted polarizing plate, whereby produced were the liquid crystal display devices 101 to 130 and 201 to 218 each corresponding to the polarizing plates 101 to 130 and 201 to 218 respectively.

These liquid crystal display devices were evaluated in terms of front contrast, stripe and visibility. Results are shown in Table 3.

<<Evaluation of Front Contrast>>

In the environment of 23° C., 55% RH, after the backlight of each of the liquid crystal display devices was continuously lighted for one week, the measurement was performed. EZ-Contrast 160D manufactured by ELDIM was used for the measurement in such a way that the luminance from the normal line direction of the display screen was measured on a white display mode and a black display mode of the liquid crystal display, and the ratio between the luminance values on the white display mode and the black display mode was observed as the front contrast Front contrast=(Luminance on the white display mode measured from the normal line direction of the display device)/(Luminance on the black display mode measured from the normal line direction of the display device)

<<Unevenness like Stripe>>

In view of evaluating deterioration by heating, above prepared liquid crystal display devices each was treated for 300 hours under 60° C. and then conditions was backed to 23° C., 55% RH. Consequently, after 2 hours from lighting up a backlight by turning on the power, unevenness like stripe appeared on a black display mode was evaluated by visual inspection based on the following criteria:

A: No unevenness like stripe was noticed.

B: Weak unevenness like stripe was noticed in the center of the display device.

C: Weak unevenness like stripe was noticed from the center to the edge of the display device.

D: Strong unevenness like stripe was noticed all over the display device.

Criteria better than B is practically non-problematic.

<<Evaluation of Visibility>>

Above prepared liquid crystal display devices each was preserved for 100 hours under 60° C., 90% RH and then conditions was backed to 23° C., 55% RH. Consequently, a surface of the display device was evaluated. The display device comprising the polarizing plate of the present invention exhibited excellent flatness, however, in the case of comparable display device, minute unevenness like wave appeared and eyes tended to tire when viewing over an extended duration.

A: No unevenness like wave was noticed on surface of the display device.

B: Slight unevenness like wave was noticed on surface of the display device.

C: Weak minute unevenness like wave was noticed on surface of the display device.

D: Minute unevenness like wave was noticed on surface of the display device.

Results of above evaluation were listed in Tables 4 and 5.

TABLE 4

| No. of Polarizing plate | No. of Liquid crystal display device | Unevenness like Stripe | Visibility | Front Contrast | Remarks |
|---|---|---|---|---|---|
| 101 | 101 | A | A | 1170 | Inv. |
| 102 | 102 | A | A | 1150 | Inv. |
| 103 | 103 | B | A | 1170 | Inv. |
| 104 | 104 | B | B | 1120 | Inv. |
| 105 | 105 | A | B | 1110 | Inv. |
| 106 | 106 | B | A | 1120 | Inv. |
| 107 | 107 | B | B | 1110 | Inv. |
| 108 | 108 | B | B | 1050 | Inv. |
| 109 | 109 | B | B | 1150 | Inv. |
| 110 | 110 | A | A | 1170 | Inv. |
| 111 | 111 | B | B | 1120 | Inv. |
| 112 | 112 | A | B | 1110 | Inv. |
| 113 | 113 | A | A | 1150 | Inv. |
| 114 | 114 | A | A | 1150 | Inv. |
| 115 | 115 | B | B | 1110 | Inv. |
| 116 | 116 | A | B | 1110 | Inv. |
| 117 | 117 | B | B | 1050 | Inv. |
| 118 | 118 | A | A | 1150 | Inv. |
| 119 | 119 | D | C | 920 | Comp. |
| 120 | 120 | D | C | 910 | Comp. |
| 121 | 121 | D | C | 900 | Comp. |
| 122 | 122 | C | C | 910 | Comp. |
| 123 | 123 | C | C | 900 | Comp. |
| 124 | 124 | C | D | 890 | Comp. |
| 125 | 125 | D | D | 870 | Comp. |
| 126 | 126 | D | D | 870 | Comp. |
| 127 | 127 | C | D | 850 | Comp. |
| 128 | 128 | C | D | 850 | Comp. |
| 129 | 129 | D | D | 850 | Comp. |
| 130 | 130 | D | D | 820 | Comp. |

TABLE 5

| No. of Polarizing plate | No. of Liquid crystal display device | Unevenness like Stripe | Visibility | Front Contrast | Remarks |
|---|---|---|---|---|---|
| 201 | 201 | B | A | 1170 | Inv. |
| 202 | 202 | A | A | 1150 | Inv. |
| 203 | 203 | A | A | 1170 | Inv. |
| 204 | 204 | B | B | 1150 | Inv. |
| 205 | 205 | B | B | 1110 | Inv. |
| 206 | 206 | B | A | 1120 | Inv. |
| 207 | 207 | A | B | 1110 | Inv. |
| 208 | 208 | B | B | 1050 | Inv. |
| 209 | 209 | B | B | 1120 | Inv. |
| 210 | 210 | A | A | 1170 | Inv. |
| 211 | 211 | B | B | 1050 | Inv. |
| 212 | 212 | A | B | 1110 | Inv. |
| 213 | 213 | A | A | 1150 | Inv. |
| 214 | 214 | A | A | 1150 | Inv. |
| 215 | 215 | B | B | 1110 | Inv. |
| 216 | 216 | A | B | 1110 | Inv. |
| 217 | 217 | B | B | 1120 | Inv. |
| 218 | 218 | A | A | 1150 | Inv. |

The results described in Tables 4 and 5 clearly show that any of the cellulose acetate films of the present invention were superior to the comparative cellulose acetate films.

Further, the liquid crystal display device of the present invention clearly exhibits excellent performances in color tone variation and front contrast.

What is claimed is:

1. A cellulose acetate film comprising a cellulose acetate having a degree of acetylation of 51.0 -56.0% and a compound represented by Formula (1) having a total average substitution degree of 6.1 - 6.9,

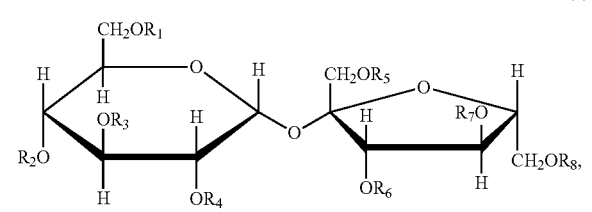

Formula (1)

wherein $R_1$ to $R_8$ each represents a substituted or an unsubstituted alkylcarbonyl group or a substituted or an unsubstituted arylcarbonyl group and $R_1$ to $R_8$ may be the same or different.

2. The cellulose acetate film of claim 1, wherein the compound represented by Formula (1) has a distribution of substitution degree of 4 - 8.

3. The cellulose acetate film of claim 1 further comprising an ester compound represented by Formula (2), B-(G-A)$_n$-G-B            Formula (2):

wherein B represents hydroxyl group or carboxylic residue, G represents alkylene glycol residue having carbon number of 2 -12 or aryl glycol residue having carbon number of 6 - 12 or oxyalkylene glycol residue having carbon number of 4 - 12, A represents alkylene dicarboxylic residue having carbon number of 4 - 12 or aryl dicarboxylic residue having carbon number of 6 -12, and n represents an integer of not less than 1.

4. The cellulose acetate film of claim 1, wherein the cellulose acetate film has a retardation value Ro of 30 to 90 nm defined by Expression (I), and a retardation value Rt of 70 to 300 nm defined by Expression (II);

$$Ro = (n-ny) \times d, \qquad \text{Expression (I)}$$

$$Rt = \{(nx+ny)/2 - nz\} \times d, \qquad \text{Expression (II)}$$

wherein nx represents an in-plane refractive index in a slow axis direction; ny represents an in-plane refractive index in a fast axis direction; nz represents a refractive index in the thickness direction; and d represents a thickness (nm) of the film.

5. The cellulose acetate film of claim 1, wherein an internal haze values of the cellulose acetate film is not more than 0.05, provided that the internal haze is determined by using a haze meter by dropping a solvent having a refractive index of +0.05 - -0.05 onto a film surface.

6. A polarizing plate wherein the cellulose acetate film of claim 1 is employed to at least one side of the polarizing plate.

7. A liquid crystal display wherein the polarizing plate of claim 6 is employed to at least one side of the liquid crystal display.

* * * * *